(12) United States Patent
Ryu et al.

(10) Patent No.: US 11,601,419 B2
(45) Date of Patent: Mar. 7, 2023

(54) USER INTERFACES FOR ACCESSING AN ACCOUNT

(71) Applicant: Apple Inc., Cupertino, CA (US)

(72) Inventors: Keetae Ryu, San Jose, CA (US); Dmitry V. Belov, Santa Clara, CA (US); Jonathan Birdsall, San Jose, CA (US); Frank De Jong, San Francisco, CA (US); Richard Mondello, Mountain View, CA (US); Hannah S. Story, San Mateo, CA (US); Patrick L. Coffman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/104,750

(22) Filed: Nov. 25, 2020

(65) Prior Publication Data

US 2021/0400032 A1 Dec. 23, 2021

Related U.S. Application Data

(60) Provisional application No. 63/041,964, filed on Jun. 21, 2020.

(51) Int. Cl.
*H04L 29/06* (2006.01)
*G06F 3/0482* (2013.01)
(Continued)

(52) U.S. Cl.
CPC .......... *H04L 63/083* (2013.01); *G06F 3/0482* (2013.01); *G06F 3/04847* (2013.01);
(Continued)

(58) Field of Classification Search
CPC . H04L 63/083; H04L 63/0861; G06F 3/0482; G06F 3/04847; G06F 3/04883; G06F 2203/04808
See application file for complete search history.

(56) References Cited

U.S. PATENT DOCUMENTS

| 8,112,787 B2 | 2/2012 | Buer |
| 8,689,001 B1 | 4/2014 | Satish et al. |

(Continued)

FOREIGN PATENT DOCUMENTS

| CN | 101529832 A | 9/2009 |
| CN | 104487927 A | 4/2015 |

(Continued)

OTHER PUBLICATIONS

Notice of Acceptance received for Australian Patent Application No. 2019250143, dated Jan. 29, 2021, 3 pages.

(Continued)

*Primary Examiner* — Tadesse Hailu
*Assistant Examiner* — Darrin Hope
(74) *Attorney, Agent, or Firm* — Dentons US LLP

(57) ABSTRACT

The present disclosure generally relates to methods for providing an upgrade option for accessing an account on a service. In some embodiments, the method is performed at a computer system that is in communication with a display generation component and one or more input devices, and includes displaying a user interface that includes information associated with a service provided by a first entity, receiving a first user input, and in response to receiving the first user input, displaying a first selectable user interface object corresponding to an upgrade option. Enabling the upgrade option causes login requests corresponding to requests to log in to the service using an access account to be authenticated by a second entity different from the first entity.

33 Claims, 22 Drawing Sheets

(51) Int. Cl.
- *G06F 3/0484* (2022.01)
- *H04L 9/40* (2022.01)
- *G06F 3/04847* (2022.01)
- *G06F 3/04883* (2022.01)

(52) U.S. Cl.
CPC ...... *H04L 63/0861* (2013.01); *G06F 3/04883* (2013.01); *G06F 2203/04808* (2013.01)

(56) References Cited

U.S. PATENT DOCUMENTS

| | | | |
|---|---|---|---|
| 9,313,170 | B1 | 4/2016 | Shoemaker et al. |
| 10,510,073 | B2 | 12/2019 | Wong et al. |
| 10,698,701 | B1 | 6/2020 | De Jong et al. |
| 2005/0021975 | A1 | 1/2005 | Liu |
| 2007/0013662 | A1 | 1/2007 | Fauth |
| 2007/0078786 | A1 | 4/2007 | Bous et al. |
| 2007/0245148 | A1 | 10/2007 | Buer |
| 2007/0284432 | A1 | 12/2007 | Abouyounes |
| 2009/0055910 | A1 | 2/2009 | Lee |
| 2009/0067689 | A1 | 3/2009 | Porter et al. |
| 2010/0217780 | A1 | 8/2010 | Erola et al. |
| 2011/0138450 | A1 | 6/2011 | Kesanupalli et al. |
| 2013/0198823 | A1* | 8/2013 | Hitchcock ............. H04L 63/102 726/6 |
| 2014/0195815 | A1 | 7/2014 | Taveau et al. |
| 2014/0281561 | A1 | 9/2014 | Etchegoyen et al. |
| 2015/0046336 | A1 | 2/2015 | Cummins |
| 2015/0058191 | A1 | 2/2015 | Khan et al. |
| 2015/0067496 | A1 | 3/2015 | Missig et al. |
| 2015/0067602 | A1 | 3/2015 | Bernstein et al. |
| 2015/0074615 | A1 | 3/2015 | Han et al. |
| 2015/0089636 | A1 | 3/2015 | Martynov et al. |
| 2015/0134956 | A1 | 5/2015 | Stachura et al. |
| 2015/0149899 | A1 | 5/2015 | Bernstein et al. |
| 2015/0170146 | A1 | 6/2015 | Ji et al. |
| 2015/0186636 | A1 | 7/2015 | Tharappel et al. |
| 2015/0324615 | A1 | 11/2015 | Matsumoto et al. |
| 2015/0348001 | A1 | 12/2015 | Van Os et al. |
| 2016/0078434 | A1 | 3/2016 | Huxham et al. |
| 2016/0092877 | A1 | 3/2016 | Chew |
| 2016/0142407 | A1 | 5/2016 | Chun et al. |
| 2016/0164866 | A1* | 6/2016 | Oberheide .......... H04L 63/0876 726/1 |
| 2016/0241555 | A1 | 8/2016 | Vo et al. |
| 2016/0248840 | A1 | 8/2016 | Bockhold et al. |
| 2016/0350522 | A1 | 12/2016 | Chi et al. |
| 2017/0024091 | A1 | 1/2017 | Hosier, Jr. |
| 2017/0024581 | A1 | 1/2017 | Grubel et al. |
| 2017/0046704 | A1 | 2/2017 | Büchner et al. |
| 2017/0147186 | A1 | 5/2017 | Velusamy et al. |
| 2017/0337542 | A1 | 11/2017 | Kim et al. |
| 2018/0114010 | A1 | 4/2018 | Van Os et al. |
| 2018/0213059 | A1 | 7/2018 | Alsina et al. |
| 2018/0234496 | A1 | 8/2018 | Ratias |
| 2018/0310070 | A1 | 10/2018 | Murray |
| 2020/0065470 | A1 | 2/2020 | Van Os et al. |
| 2020/0244659 | A1* | 7/2020 | Kunda .................... G06F 21/45 |
| 2021/0049021 | A1 | 2/2021 | De Jong et al. |
| 2021/0306344 | A1* | 9/2021 | Han ...................... H04L 63/105 |
| 2022/0269333 | A1 | 8/2022 | Dedonato et al. |
| 2022/0269767 | A1 | 8/2022 | Van Os et al. |

FOREIGN PATENT DOCUMENTS

| | | |
|---|---|---|
| CN | 104508618 A | 4/2015 |
| CN | 104580184 A | 4/2015 |
| CN | 104903835 A | 9/2015 |
| CN | 105357196 A | 2/2016 |
| CN | 105474224 A | 4/2016 |
| CN | 105612543 A | 5/2016 |
| CN | 105794244 A | 7/2016 |
| CN | 106503506 A | 3/2017 |
| EP | 1950678 A1 | 7/2008 |
| EP | 3273378 A1 | 1/2018 |
| KR | 20160105296 A | 9/2016 |
| WO | 2007/041834 A1 | 4/2007 |
| WO | 2014/105263 A1 | 7/2014 |
| WO | 2015/112868 A1 | 7/2015 |
| WO | 2015/153990 A1 | 10/2015 |
| WO | 2020/039327 A1 | 2/2020 |

OTHER PUBLICATIONS

Notice of Allowance received for Chinese Patent Application No. 201910498825.3, dated Mar. 8, 2021, 2 pages (1 page of English Translation and 1 page of Official Copy).

Applicant-Initiated Interview Summary received for U.S. Appl. No. 16/667,174, dated Oct. 25, 2021, 2 pages.

Brief Communication Regarding Oral Proceedings received for European Patent Application No. 17865509.8, dated Nov. 1, 2021, 2 pages.

Result of Consultation received for European Patent Application No. 17865509.8, dated Nov. 2, 2021, 3 pages.

International Search Report and Written Opinion received for PCT Patent Application No. PCT/US2021/036410, dated Sep. 15, 2021, 13 pages.

Non-Final Office Action received for U.S. Appl. No. 16/667,174, dated Jun. 24, 2021, 16 pages.

Office Action received for Chinese Patent Application No. 201780069966.2, dated Jun. 1, 2021, 23 pages (12 pages of English Translation and 11 pages of Official Copy).

Certificate of Examination received for Australian Patent Application No. 2017101425, dated Jan. 17, 2018, 2 pages.

Decision to Grant received for Danish Patent Application No. PA201770804, dated Jun. 28, 2019., 2 pages.

European Search Report received for European Patent Application No. 17865509.8, dated Oct. 2, 2019, 5 pages.

Intention to Grant received for Danish Patent Application No. PA201770804, dated Apr. 10, 2019, 2 pages.

International Preliminary Report on Patentability received for PCT Patent Application No. PCT/US2017/058368, dated Feb. 19, 2019, 5 pages.

International Search Report and Written Opinion received for PCT Patent Application No. PCT/US2017/058368, dated Feb. 23, 2018, 12 pages.

International Search Report and Written Opinion received for PCT Patent Application No. PCT/US2020/035464, dated Sep. 14, 2020, 10 pages.

Invitation to Pay Additional Fee received for PCT Patent Application No. PCT/US2017/058368, dated Dec. 14, 2017, 2 pages.

Non-Final Office Action received for U.S. Appl. No. 15/782,068, dated Jun. 3, 2019, 17 Pages.

Notice of Acceptance received for Australian Patent Application No. 2017317605, dated Aug. 28, 2019, 3 Pages.

Notice of Allowance received for U.S. Appl. No. 15/782,068, dated Sep. 24, 2019, 7 pages.

Notice of Allowance received for U.S. Appl. No. 16/585,178, dated Jan. 29, 2020, 9 pages.

Office Action received for Australian Patent Application No. 2017317605, dated Apr. 11, 2019, 4 pages.

Office Action received for Australian Patent Application No. 2017317605, dated Feb. 22, 2019, 4 pages.

Office Action received for Australian Patent Application No. 2019250143, dated Dec. 3, 2020, 5 pages.

Office Action received for Australian Patent Application No. 2019250143, dated Sep. 15, 2020, 5 pages.

Office Action received for Chinese Patent Application No. 201910498825.3, dated May 21, 2020, 16 pages (9 pages of English Translation and 7 pages of Official Copy).

Office Action received for Danish Patent Application No. PA201770804, dated Feb. 1, 2018, 9 pages.

Office Action received for Danish Patent Application No. PA201770804, dated May 31, 2018, 6 pages.

Office Action received for Danish Patent Application No. PA201770804, dated Nov. 6, 2018., 4 pages.

(56) References Cited

OTHER PUBLICATIONS

Office Action received for European Patent Application No. 17865509.8, dated Jul. 28, 2020, 8 pages.
Office Action received for European Patent Application No. 17865509.8, dated Oct. 10, 2019, 6 pages.
Office Action received for German Patent Application No. 202017005507.4, dated Feb. 5, 2018, 2 pages (1 page of English Translation and 1 page of Official Copy).
Search Report received for Germany Patent Application No. 202017005507.4, dated Jan. 2, 2019, 6 pages (1 page of English Translation and 5 pages of Official Copy).
Summons to Attend Oral Proceedings received for European Patent Application No. 17865509.8, dated Jul. 14, 2021, 8 pages.
Corrected Notice of Allowance received for U.S. Appl. No. 16/667,174, dated Mar. 9, 2022, 2 pages.
Notice of Allowance received for Chinese Patent Application No. 201780069966.2, dated Feb. 23, 2022, 4 pages (1 page of English Translation and 3 pages of Official Copy).
Notice of Allowance received for U.S. Appl. No. 16/667,174, dated Feb. 24, 2022, 7 pages.
International Preliminary Report on Patentability received for PCT Patent Application No. PCT/US2020/035464, dated Dec. 16, 2021, 7 pages.
Non-Final Office Action received for U.S. Appl. No. 16/915,572, dated Dec. 8, 2021, 20 pages.
Decision to Refuse received for European Patent Application No. 17865509.8, dated Jan. 4, 2022, 13 pages.
Minutes of the Oral Proceedings received for European Patent Application No. 17865509.8, dated Jan. 4, 2022, 8 pages.
Applicant-Initiated Interview Summary received for U.S. Appl. No. 16/915,572, dated Apr. 13, 2022, 2 pages.
Corrected Notice of Allowance received for U.S. Appl. No. 16/667,174, dated Apr. 12, 2022, 2 pages.
Office Action received for Australian Patent Application No. 2021202959, dated Apr. 22, 2022, 6 pages.
Thirumavalavan Viruthagiri, "A Spamless Internet", Available at: https://www.dombox.org/dombox.pdf, Feb. 2019, 299 pages.
Thirumavalavan Viruthagiri, "Dombox—The Zero Spam Mail System", Available Online at: https://web.archive.org/web/20190217071649/https://medium.com/@Viruthagiri/dombox-the-zero-spam-mail-system-2b08ff7432cd, Feb. 17, 2019, 32 pages.
Bate, Ben, "Effective Examples of Mobile App Login Screens", Available online at: https://web.archive.org/web/20180406231319/https://1stwebdesigner.com/mobile-app-login-screens/, Mar. 30, 2018, 7 pages.
Extended European Search Report received for European Patent Application No. 22159861.8, dated Jul. 8, 2022, 10 pages.
International Search Report and Written Opinion received for PCT Patent Application No. PCT/US2022/016804, dated Jul. 25, 2022, 18 pages.
International Search Report and Written Opinion received for PCT Patent Application No. PCT/US2022/016804, dated Jul. 28, 2022, 18 pages.
Invitation to Pay Additional Fees and Partial International Search Report received for PCT Patent Application No. PCT/US2022/016804, dated Jun. 2, 2022, 13 pages.
Notice of Acceptance received for Australian Patent Application No. 2021202959, dated Jun. 8, 2022, 3 pages.
Notice of Allowance received for Chinese Patent Application No. 202080040618.4, dated Aug. 9, 2022, 7 pages (4 pages of English Translation and 3 pages of Official Copy).
Notice of Allowance received for U.S. Appl. No. 16/667,174, dated Sep. 13, 2022, 7 pages.
Notice of Allowance received for U.S. Appl. No. 16/915,572, dated Jul. 21, 2022, 6 pages.
Office Action received for European Patent Application No. 20746436.3, dated Sep. 15, 2022, 7 pages.

\* cited by examiner

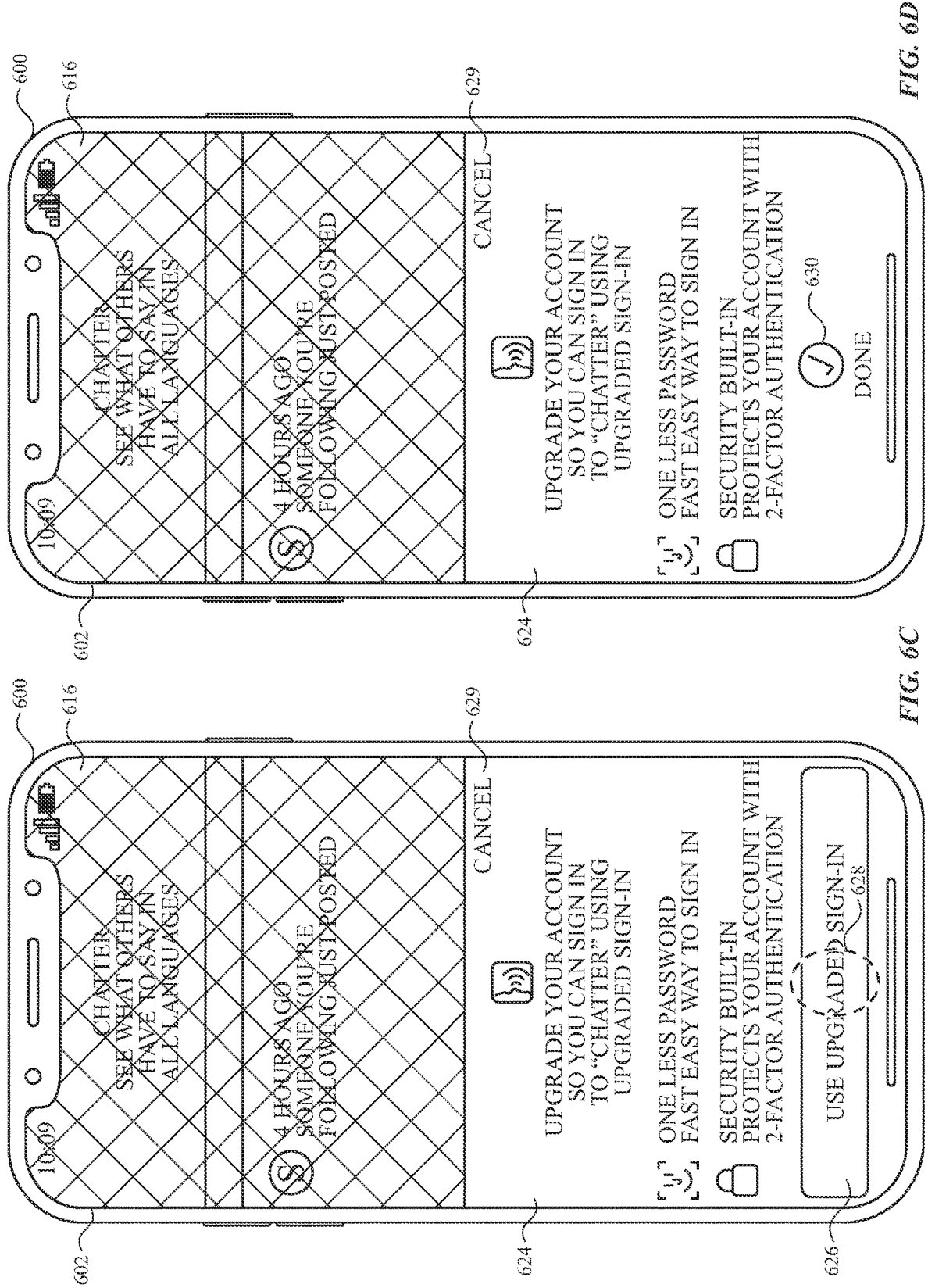

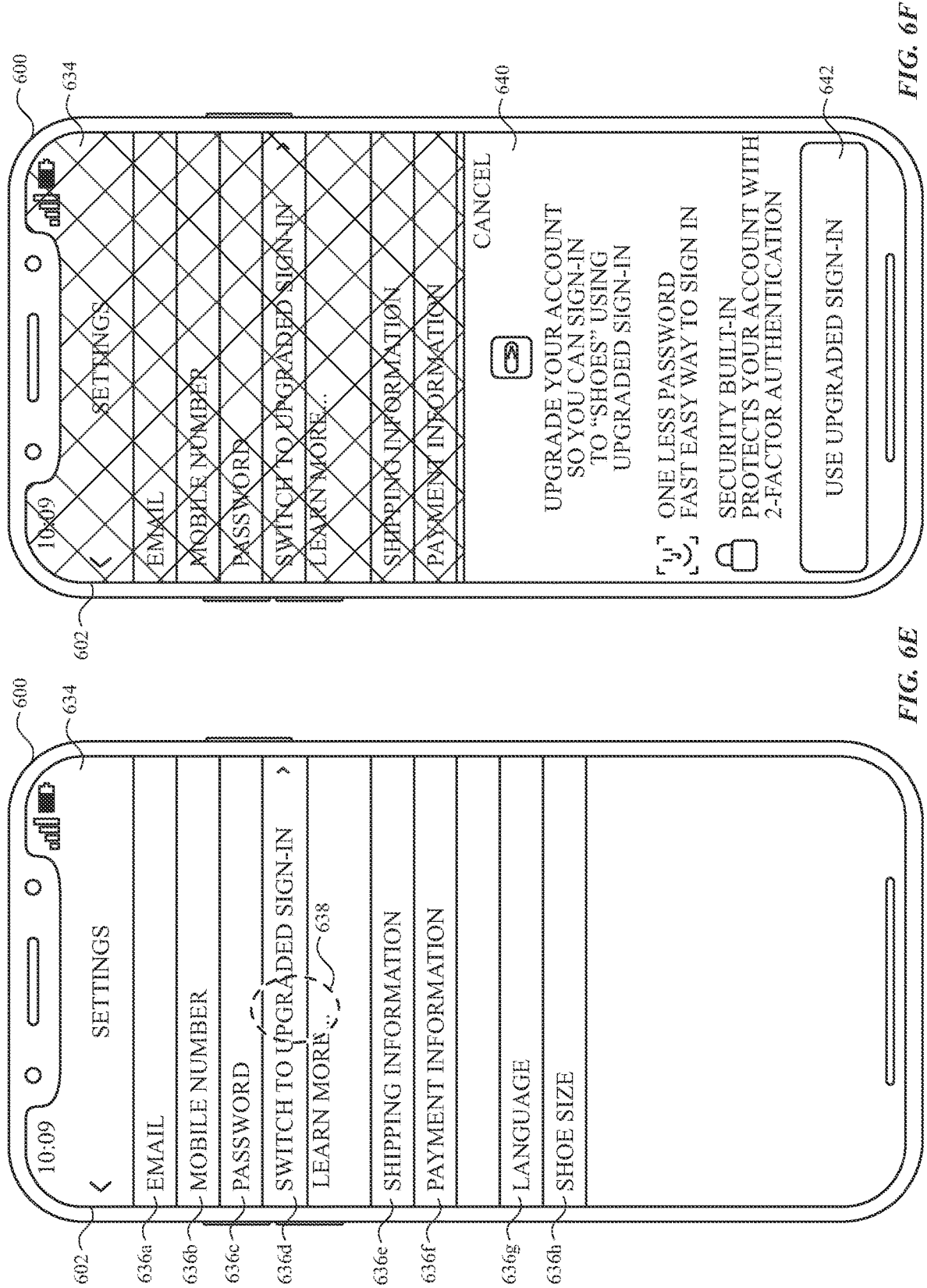

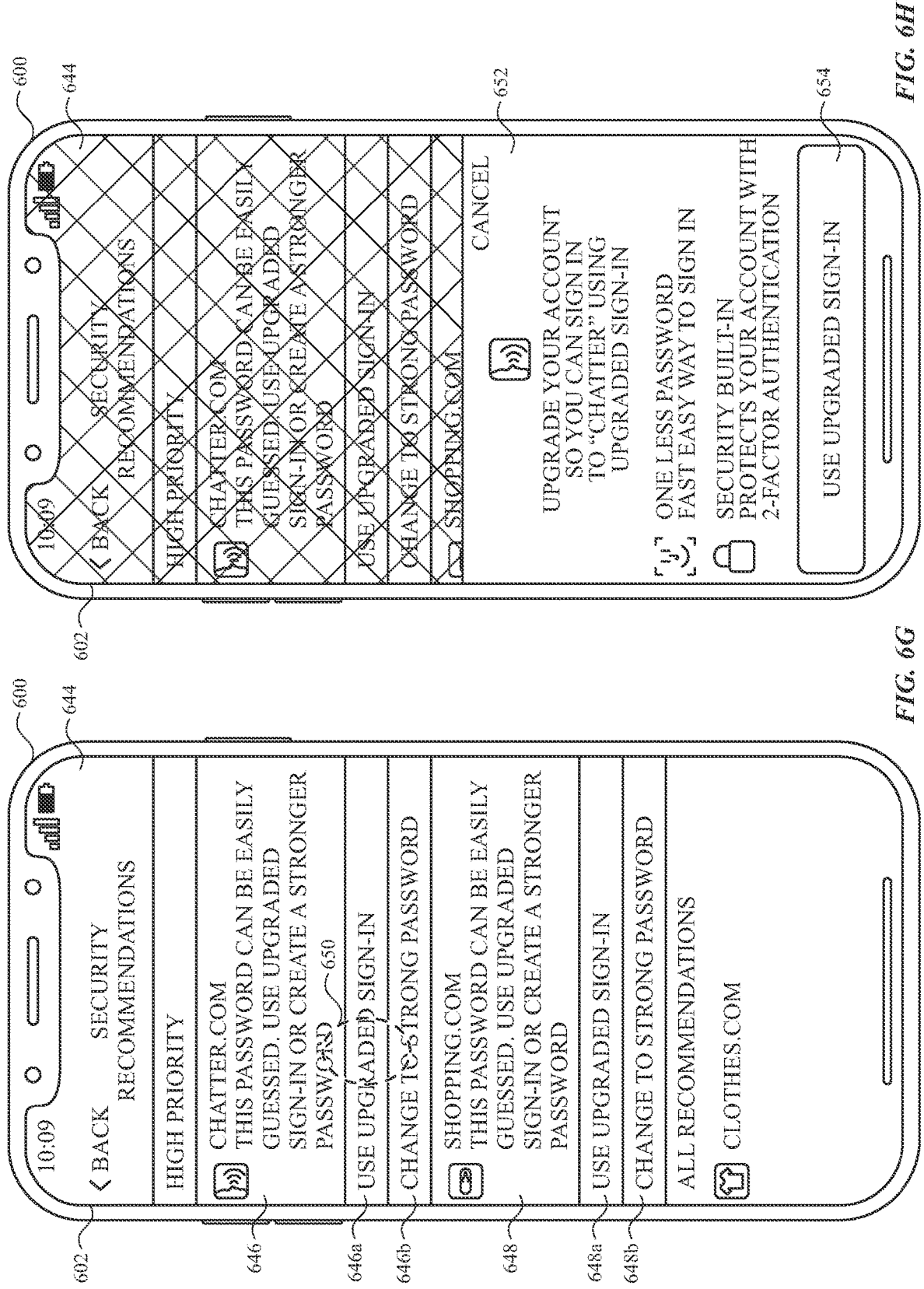

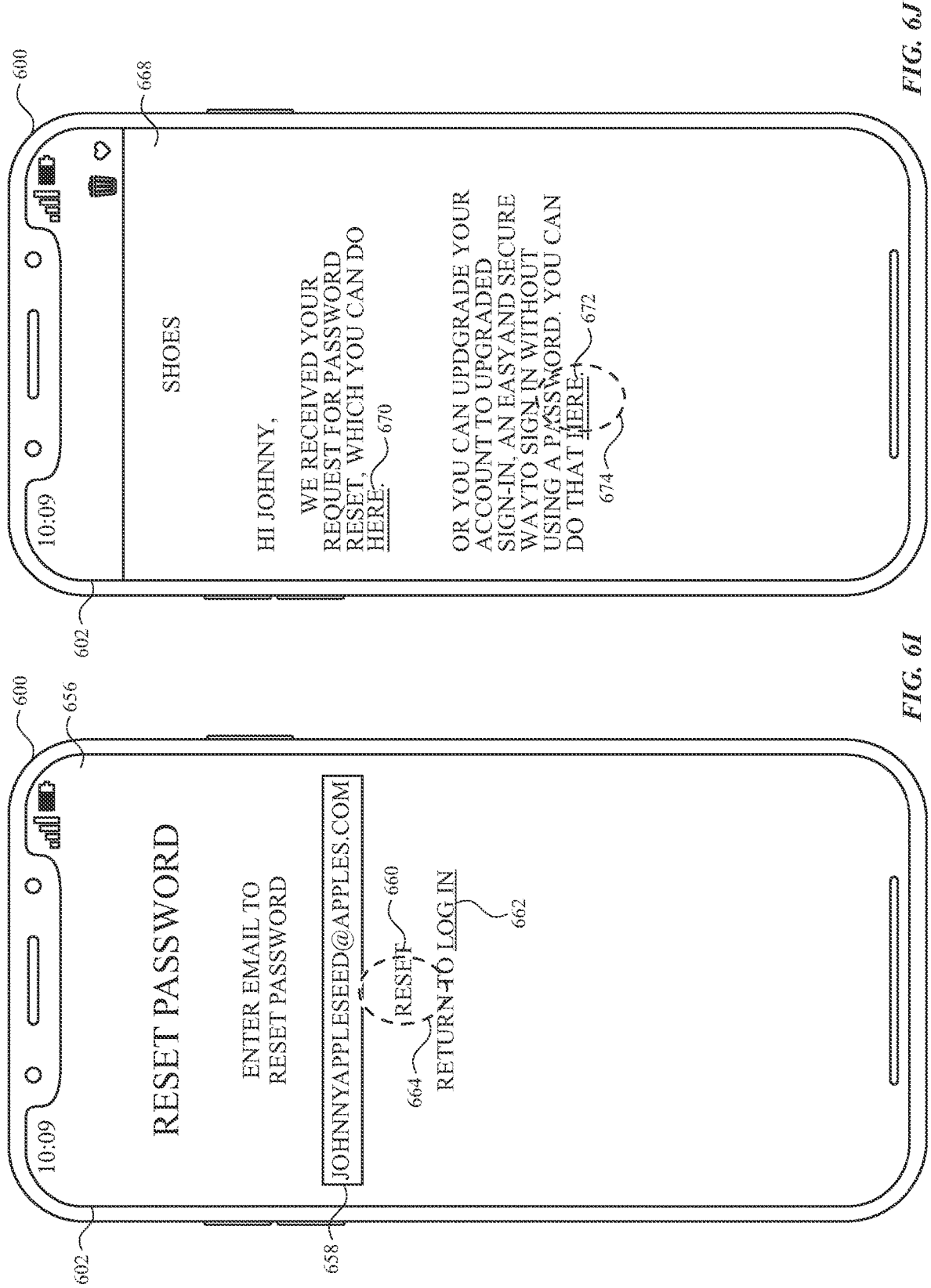

700 ↘

702
Display, via the display generation component, a user interface that includes information associated with a service provided by a first entity.

> 726
> The user interface is a login user interface for logging in to the service provided by the first entity, and the first user input corresponds to a log in option and is indicative of a request to log in to the service provided by the first entity using the access account.

704
While displaying the user interface that includes information associated with the service provided by the first entity:

706
Receive, via the one or more input devices, a first user input.

708
In response to receiving the first user input, and in accordance with a determination that a set of criteria is satisfied, wherein the set of criteria includes a first criterion that is met when login requests for an access account of the service are configured to be authenticated by the first entity:

710
Display, via the display generation component, a first selectable user interface object corresponding to an upgrade option, wherein the upgrade option is associated with the access account.

> 722
> The set of criteria includes a second criterion that is met when a password corresponding to the access account does not satisfy one or more security criteria.

USER INTERFACES FOR ACCESSING AN ACCOUNT

CROSS-REFERENCE TO RELATED APPLICATIONS

This application claims priority to U.S. Provisional Application No. 63/041,964, filed Jun. 21, 2020, entitled "USER INTERFACES FOR ACCESSING AN ACCOUNT", the entire contents of which are hereby incorporated by reference.

FIELD

The present disclosure relates generally to computer user interfaces, and more specifically to techniques for providing an upgrade option for accessing an account for a service.

BACKGROUND

Services such as applications or websites use user accounts to identify a user using the application or website. In many cases, the application or website provides customized information to the user based on their user account.

BRIEF SUMMARY

Some techniques for accessing an account for a service using electronic devices, however, are generally cumbersome and inefficient. For example, some existing techniques use a time-consuming user interface, which may include manually entering contact information, username information, and/or password information for the user with multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for accessing (e.g., logging into) an account for a service. Such methods and interfaces optionally complement or replace other methods for accessing accounts. Such methods and interfaces reduce the cognitive burden on a user and produce a more efficient human-machine interface. For battery-operated computing devices, such methods and interfaces conserve power and increase the time between battery charges.

In accordance with some embodiments, a method performed at a computer system that is in communication with a display generation component and one or more input devices is described. The method includes: displaying, via the display generation component, a user interface that includes information associated with a service provided by a first entity; while displaying the user interface that includes information associated with the service provided by the first entity, receiving, via the one or more input devices, a first user input; in response to receiving the first user input, and in accordance with a determination that a set of criteria is satisfied, wherein the set of criteria includes a first criterion that is met when login requests for an access account of the service are configured to be authenticated by the first entity, displaying, via the display generation component, a first selectable user interface object corresponding to an upgrade option, wherein the upgrade option is associated with the access account; while displaying the first selectable user interface object, receiving, via the one or more input devices, a second user input; and in response to receiving the second user input: in accordance with a determination that the second user input corresponds to the first selectable user interface object, initiating a process to enable the upgrade option, wherein enabling the upgrade option causes login requests corresponding to requests to log in to the service using the access account to be authenticated by a second entity different from the first entity.

In accordance with some embodiments, a non-transitory computer-readable storage medium storing one or more programs configured to be executed by one or more processors of a computer system that is in communication with a display generation component and one or more input devices is described. The one or more programs include instructions for: displaying, via the display generation component, a user interface that includes information associated with a service provided by a first entity; while displaying the user interface that includes information associated with the service provided by the first entity, receiving, via the one or more input devices, a first user input; in response to receiving the first user input, and in accordance with a determination that a set of criteria is satisfied, wherein the set of criteria includes a first criterion that is met when login requests for an access account of the service are configured to be authenticated by the first entity, displaying, via the display generation component, a first selectable user interface object corresponding to an upgrade option, wherein the upgrade option is associated with the access account; while displaying the first selectable user interface object, receiving, via the one or more input devices, a second user input; and in response to receiving the second user input: in accordance with a determination that the second user input corresponds to the first selectable user interface object, initiating a process to enable the upgrade option, wherein enabling the upgrade option causes login requests corresponding to requests to log in to the service using the access account to be authenticated by a second entity different from the first entity.

In accordance with some embodiments, a transitory computer-readable storage medium storing one or more programs configured to be executed by one or more processors of a computer system that is in communication with a display generation component and one or more input devices is described. The one or more programs include instructions for: displaying, via the display generation component, a user interface that includes information associated with a service provided by a first entity; while displaying the user interface that includes information associated with the service provided by the first entity, receiving, via the one or more input devices, a first user input; in response to receiving the first user input, and in accordance with a determination that a set of criteria is satisfied, wherein the set of criteria includes a first criterion that is met when login requests for an access account of the service are configured to be authenticated by the first entity, displaying, via the display generation component, a first selectable user interface object corresponding to an upgrade option, wherein the upgrade option is associated with the access account; while displaying the first selectable user interface object, receiving, via the one or more input devices, a second user input; and in response to receiving the second user input: in accordance with a determination that the second user input corresponds to the first selectable user interface object, initiating a process to enable the upgrade option, wherein enabling the upgrade option causes login requests corresponding to requests to log in to the service using the access account to be authenticated by a second entity different from the first entity.

In accordance with some embodiments, a computer system is described. The computer system includes: one or more processors, wherein the computer system is in communication with a display generation component and one or more inputs devices; and memory storing one or more programs configured to be executed by the one or more processors. The one or more programs include instructions for: displaying, via the display generation component, a user interface that includes information associated with a service provided by a first entity; while displaying the user interface that includes information associated with the service provided by the first entity, receiving, via the one or more input devices, a first user input; in response to receiving the first user input, and in accordance with a determination that a set of criteria is satisfied, wherein the set of criteria includes a first criterion that is met when login requests for an access account of the service are configured to be authenticated by the first entity, displaying, via the display generation component, a first selectable user interface object corresponding to an upgrade option, wherein the upgrade option is associated with the access account; while displaying the first selectable user interface object, receiving, via the one or more input devices, a second user input; and in response to receiving the second user input: in accordance with a determination that the second user input corresponds to the first selectable user interface object, initiating a process to enable the upgrade option, wherein enabling the upgrade option causes login requests corresponding to requests to log in to the service using the access account to be authenticated by a second entity different from the first entity.

In accordance with some embodiments, a computer system is described. The computer system includes: means for displaying, via the display generation component, a user interface that includes information associated with a service provided by a first entity; means for, while displaying the user interface that includes information associated with the service provided by the first entity, receiving, via the one or more input devices, a first user input; means for, in response to receiving the first user input, and in accordance with a determination that a set of criteria is satisfied, wherein the set of criteria includes a first criterion that is met when login requests for an access account of the service are configured to be authenticated by the first entity, displaying, via the display generation component, a first selectable user interface object corresponding to an upgrade option, wherein the upgrade option is associated with the access account; means for, while displaying the first selectable user interface object, receiving, via the one or more input devices, a second user input; and means for, in response to receiving the second user input: in accordance with a determination that the second user input corresponds to the first selectable user interface object, initiating a process to enable the upgrade option, wherein enabling the upgrade option causes login requests corresponding to requests to log in to the service using the access account to be authenticated by a second entity different from the first entity.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for accessing an account for a service, thereby increasing the effectiveness, efficiency, and user satisfaction with such devices. Such methods and interfaces may complement or replace other methods for accessing an account for a service.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 6A-6K illustrate exemplary user interfaces for providing an upgrade option for accessing an account on a service, in accordance with some embodiments.

FIGS. 7A-7B are a flow diagram illustrating a method for providing an upgrade option for accessing an account on a service, in accordance with some embodiments.

DESCRIPTION OF EMBODIMENTS

Figure 1A:
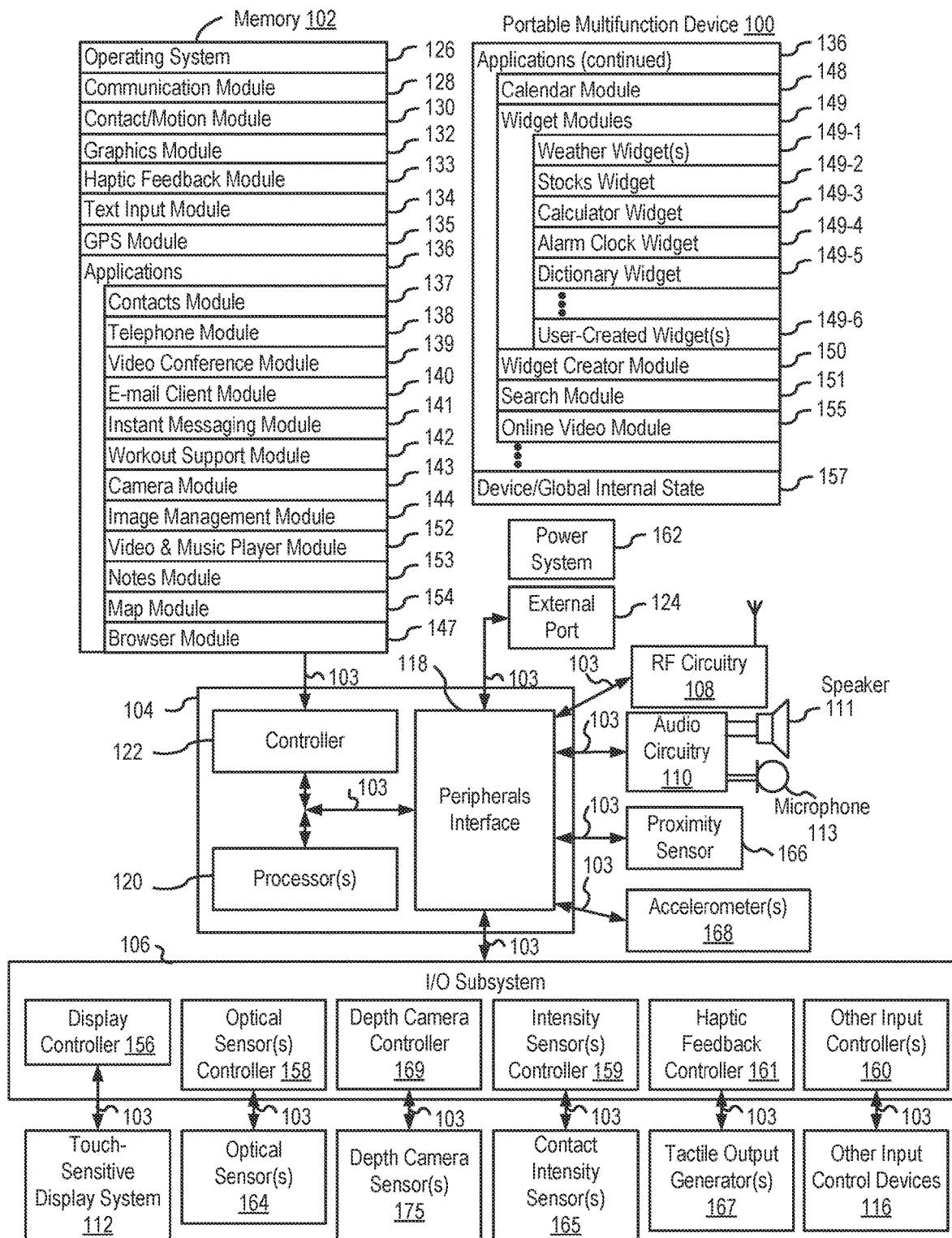
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for accessing an account for a service. For example, some existing techniques use a time-consuming user interface, which may include manually entering contact information, username information, and/or password information for the user with multiple key presses or keystrokes. In contrast, techniques of the present disclosure can reduce the cognitive burden on a user by reducing the amount of information that needs to be entered to access an account, thereby enhancing productivity, while also enhancing device security. Further, such techniques can reduce processor and battery power otherwise wasted on redundant user inputs.

Below, FIGS. 1A-1B, 2, 3, 4A-4B, and 5A-5H provide a description of exemplary devices for performing the techniques for accessing an account on a service. FIGS. 6A-6K illustrate exemplary user interfaces for providing an upgrade option for accessing an account on a service. FIGS. 7A-7B is a flow diagram illustrating methods of providing an upgrade option for accessing an account on a service in accordance with some embodiments. The user interfaces in FIGS. 6A-6K are used to illustrate the processes described below, including the processes in FIGS. 7A-7B.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
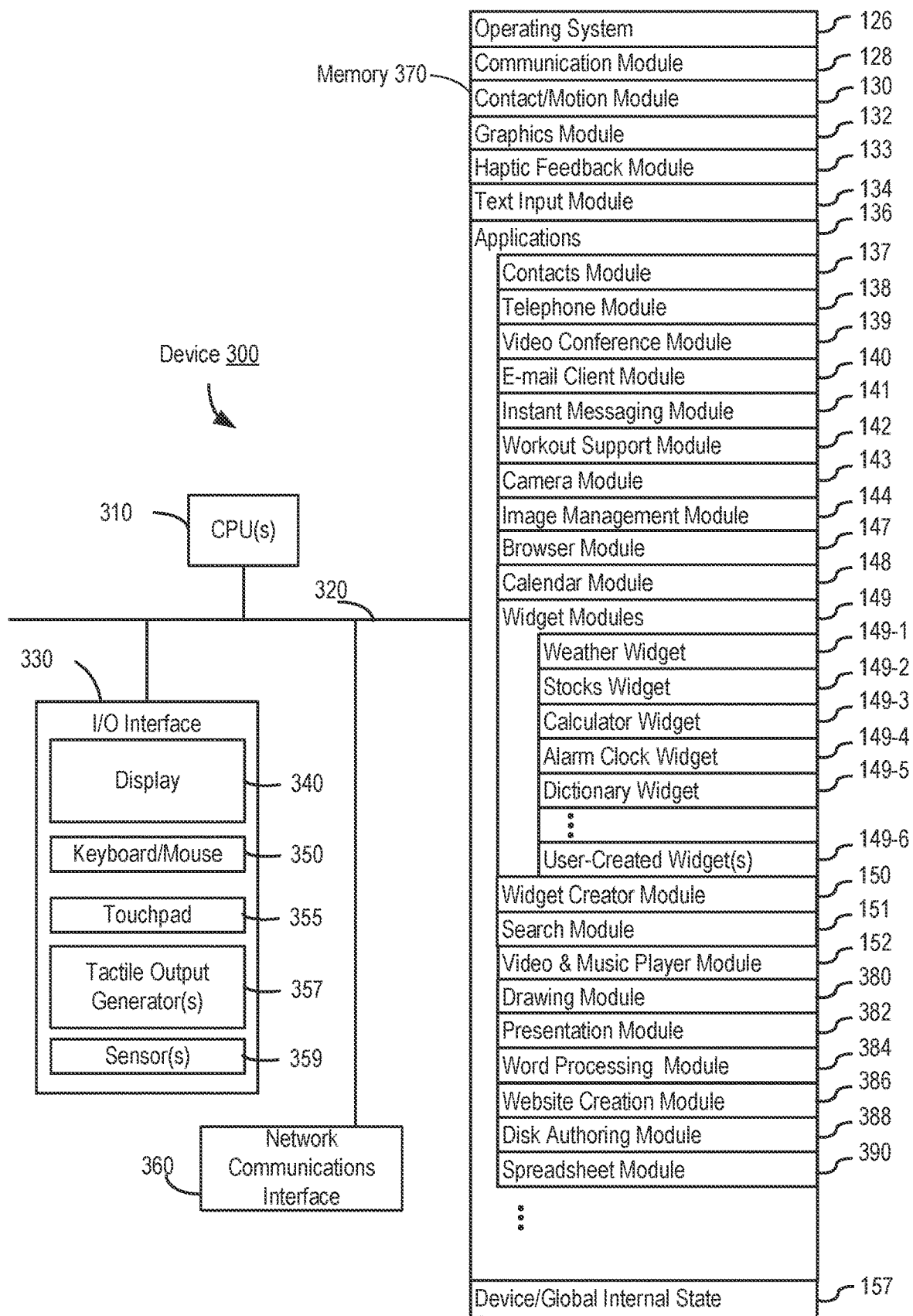
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
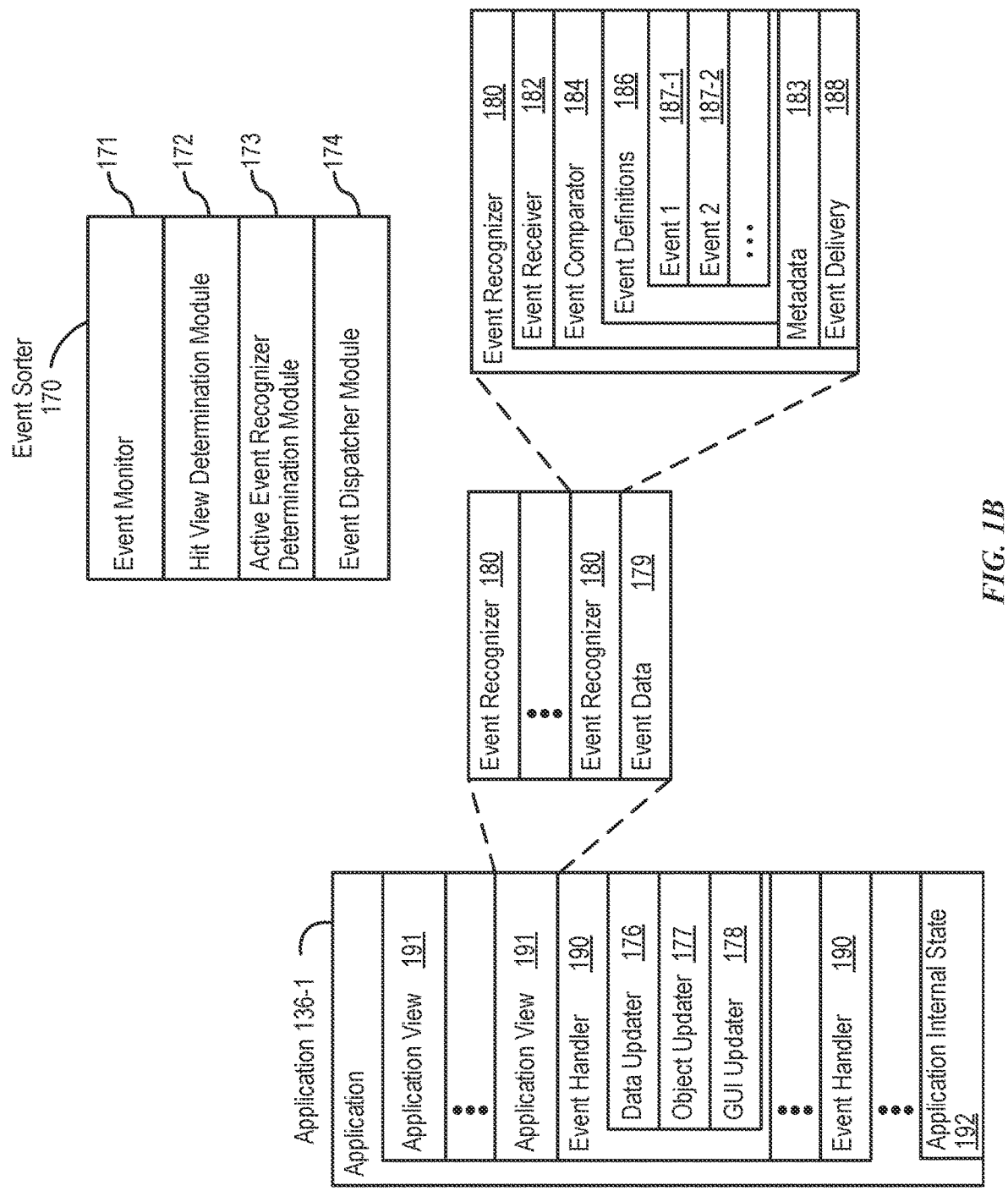
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
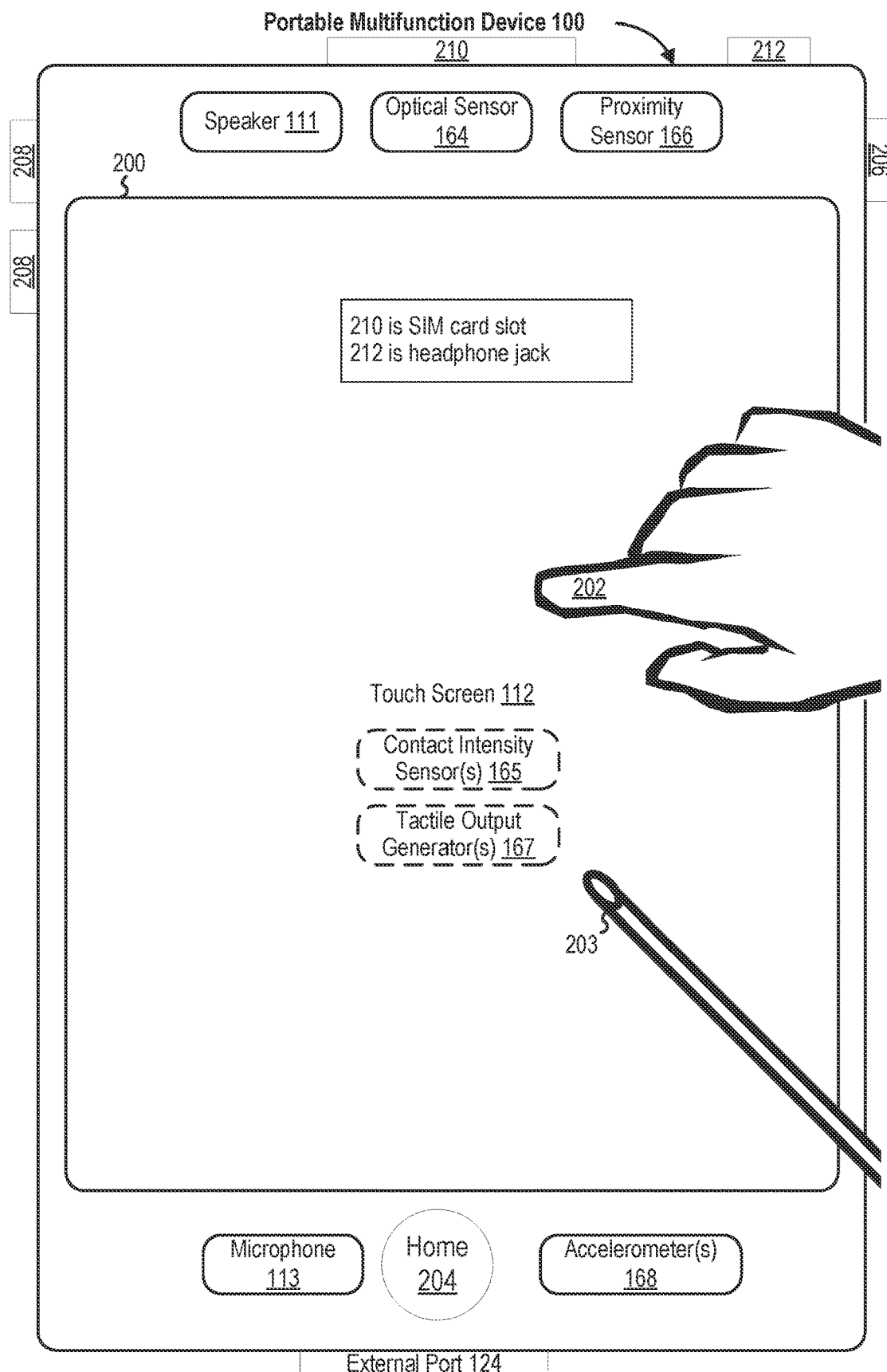
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
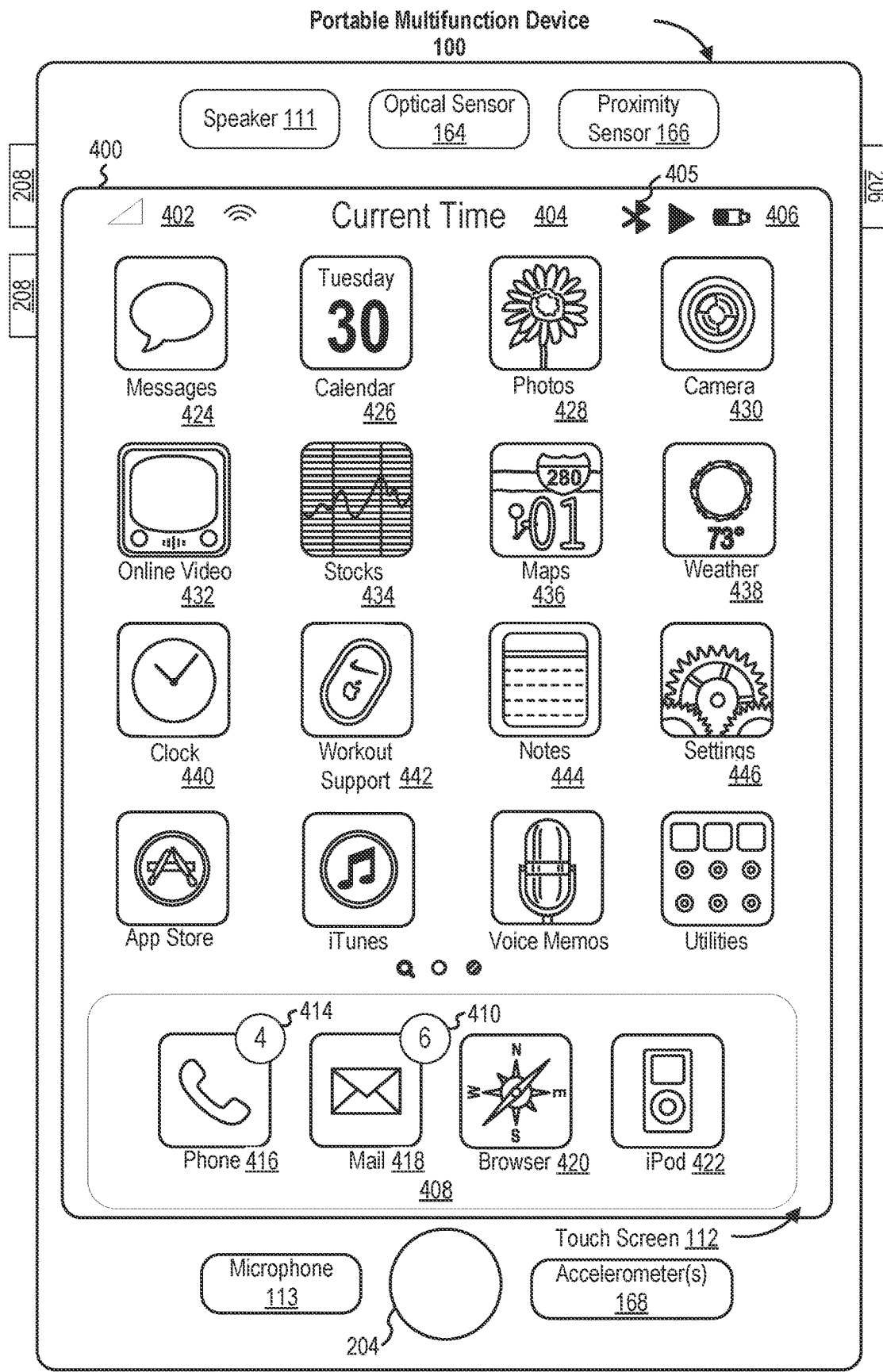
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;

Tray 408 with icons for frequently used applications, such as:
- Icon 416 for telephone module 138, labeled "Phone," which optionally includes an indicator 414 of the number of missed calls or voicemail messages;
- Icon 418 for e-mail client module 140, labeled "Mail," which optionally includes an indicator 410 of the number of unread e-mails;
- Icon 420 for browser module 147, labeled "Browser;" and
- Icon 422 for video and music player module 152, also referred to as iPod (trademark of Apple Inc.) module 152, labeled "iPod;" and Icons for other applications, such as:
- Icon 424 for IM module 141, labeled "Messages;"
- Icon 426 for calendar module 148, labeled "Calendar;"
- Icon 428 for image management module 144, labeled "Photos;"
- Icon 430 for camera module 143, labeled "Camera;"
- Icon 432 for online video module 155, labeled "Online Video;"
- Icon 434 for stocks widget 149-2, labeled "Stocks;"
- Icon 436 for map module 154, labeled "Maps;"
- Icon 438 for weather widget 149-1, labeled "Weather;"
- Icon 440 for alarm clock widget 149-4, labeled "Clock;"
- Icon 442 for workout support module 142, labeled "Workout Support;"
- Icon 444 for notes module 153, labeled "Notes;" and
- Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
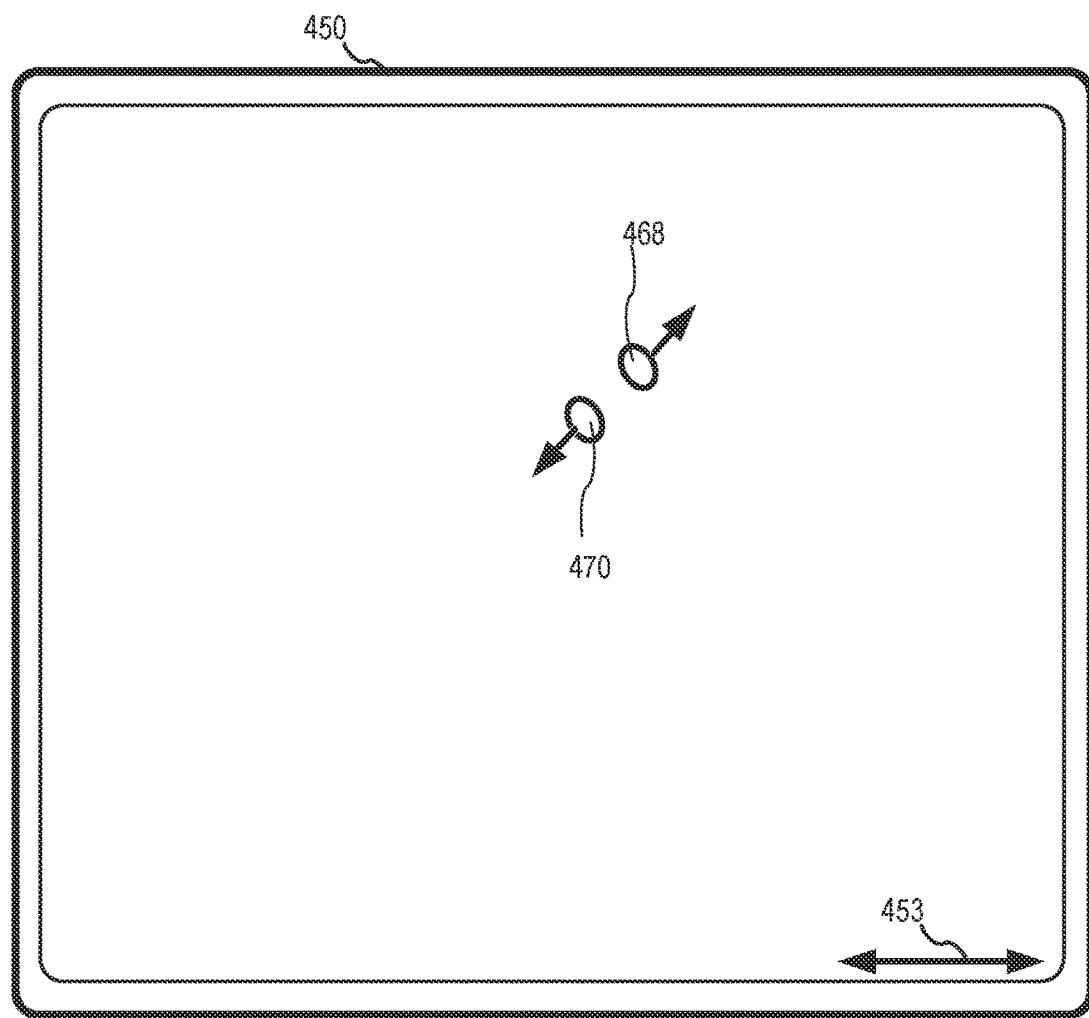
FIG. 4B illustrates an exemplary user interface for a multifunction device with a touch-sensitive surface that is separate from the display in accordance with some embodiments.
Figure 4B:
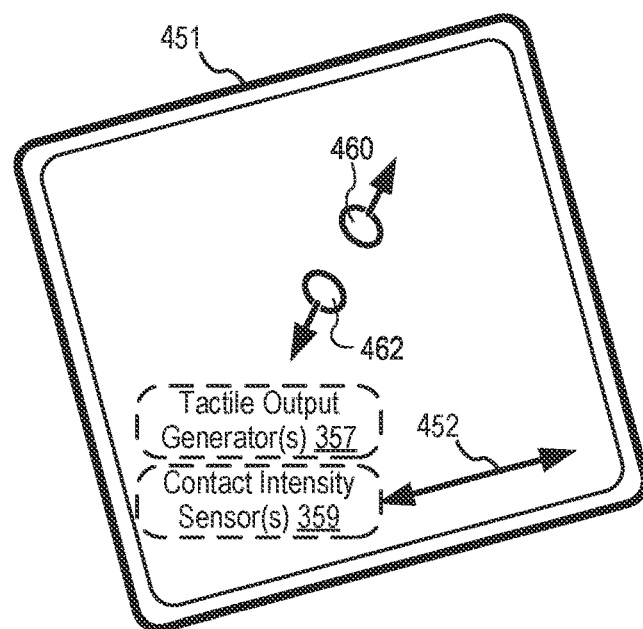

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
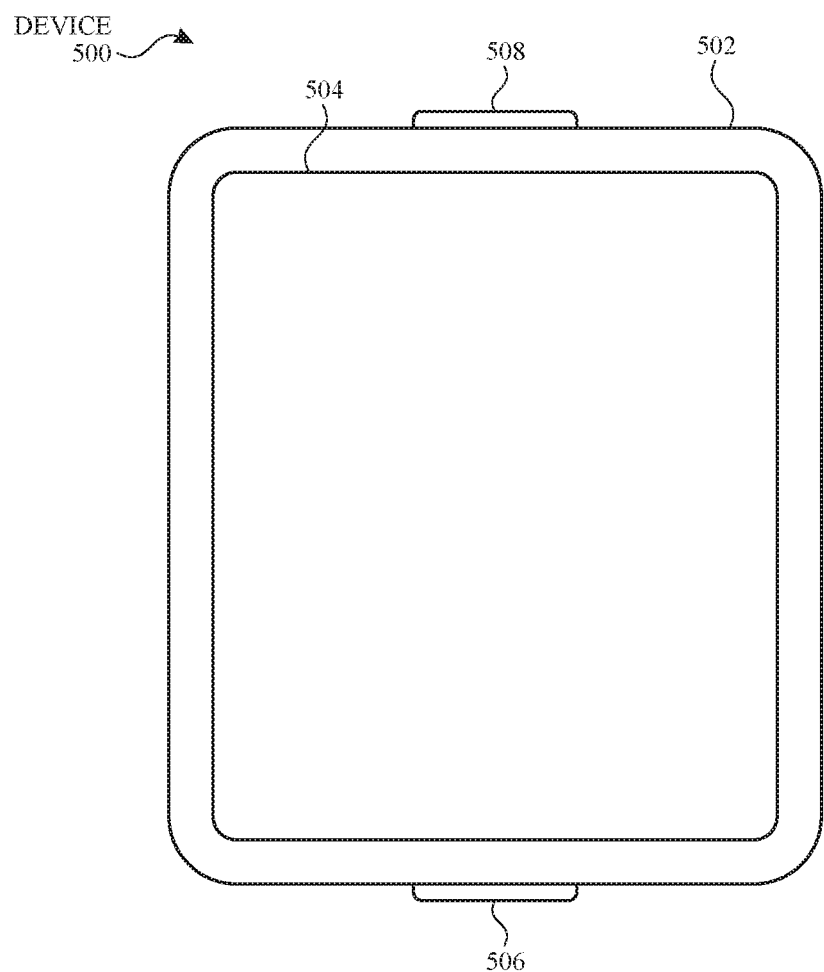
FIG. 5A illustrates a personal electronic device in accordance with some embodiments.
Figure 6B:
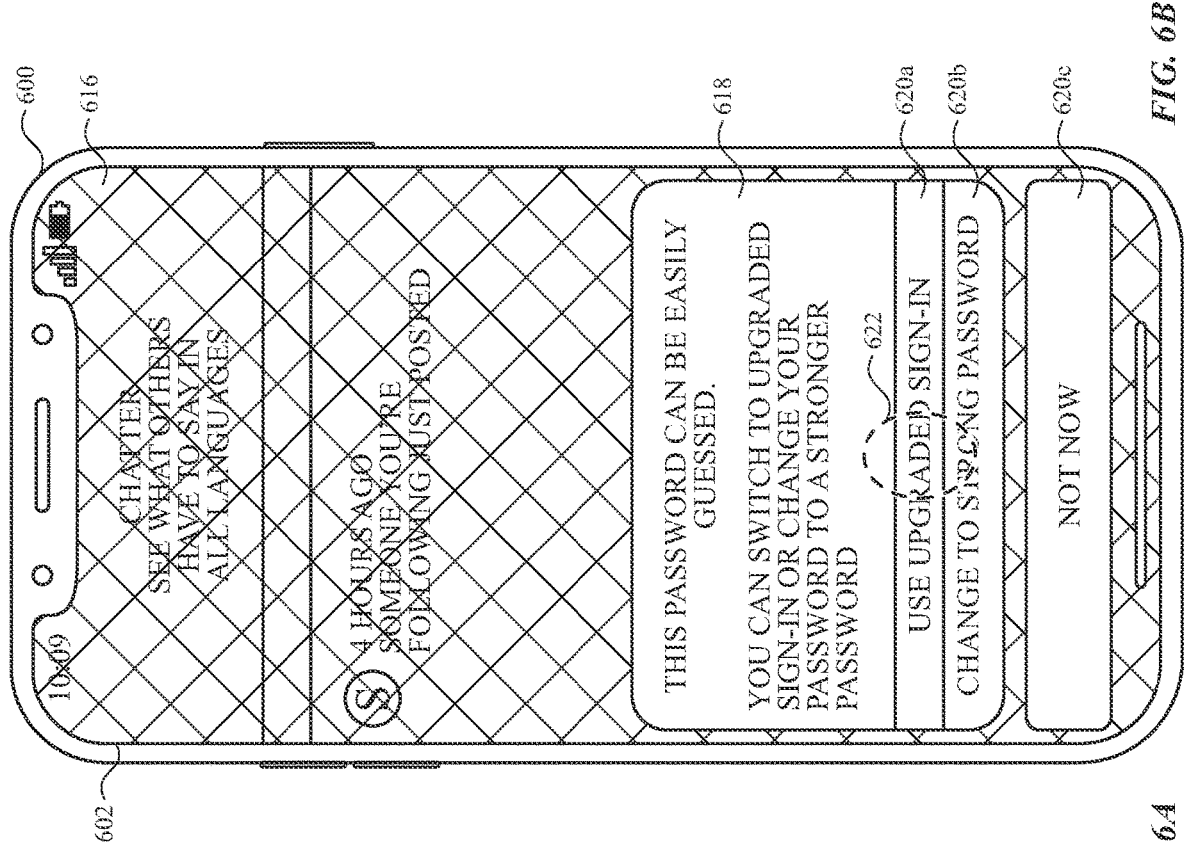

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
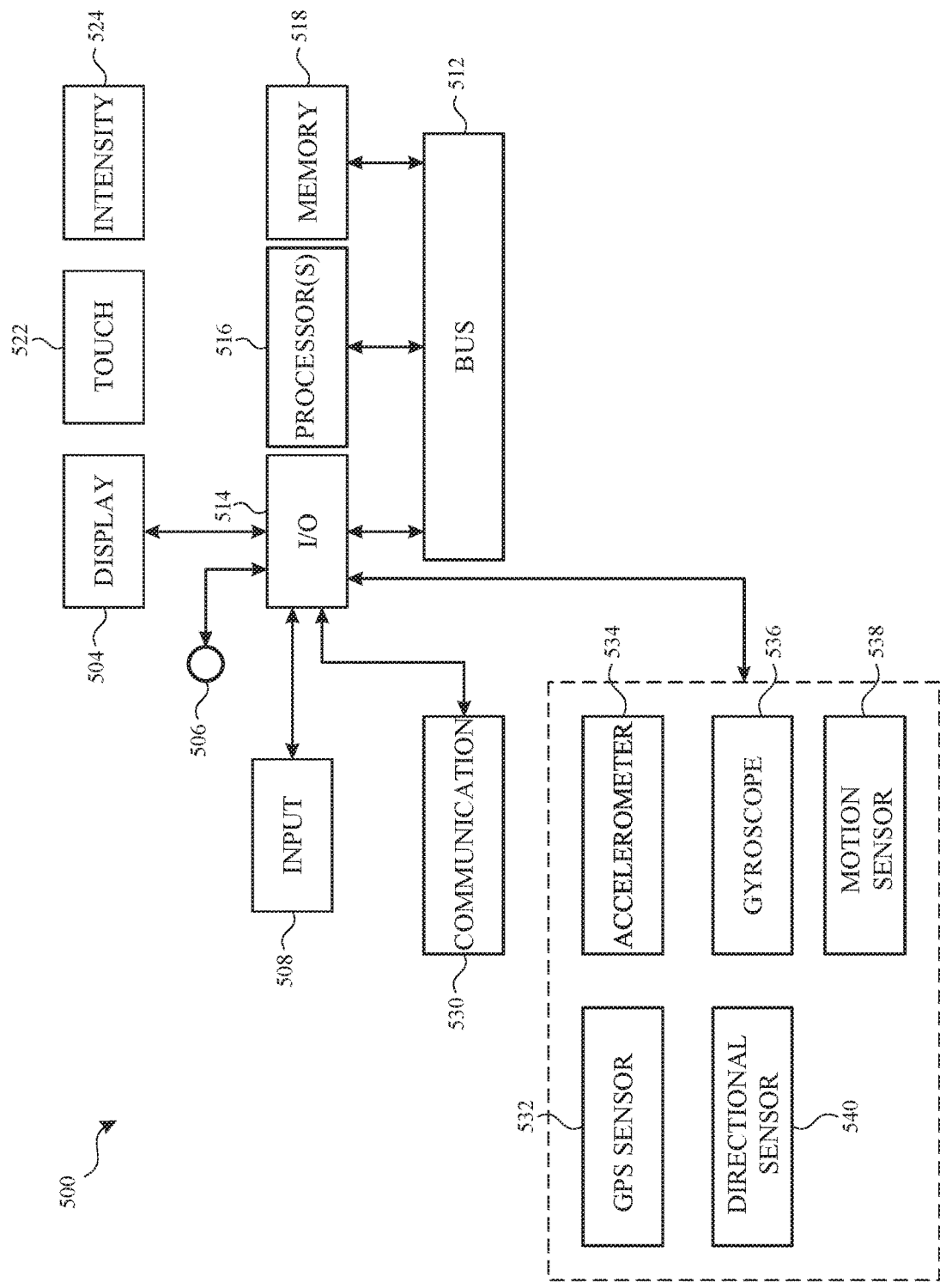
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 (FIGS. 7A-7B). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
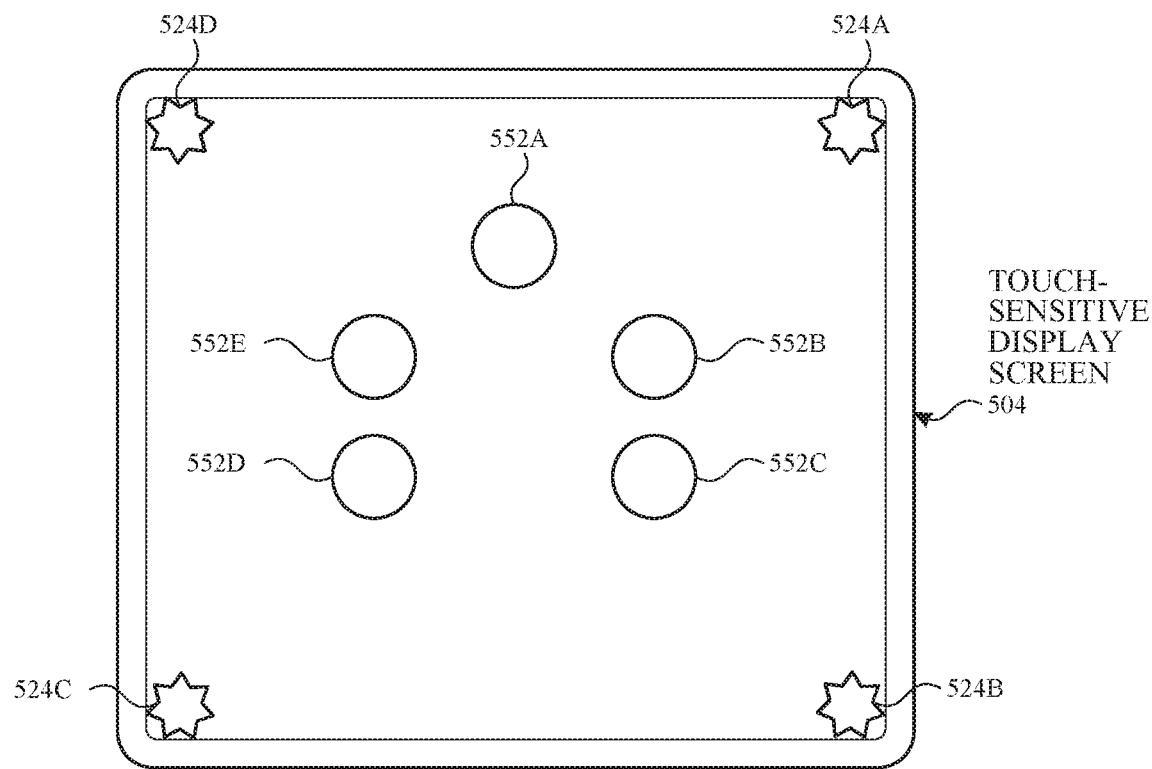
FIGS. 5C-5D illustrate exemplary components of a personal electronic device having a touch-sensitive display and intensity sensors in accordance with some embodiments.
Figure 5C:
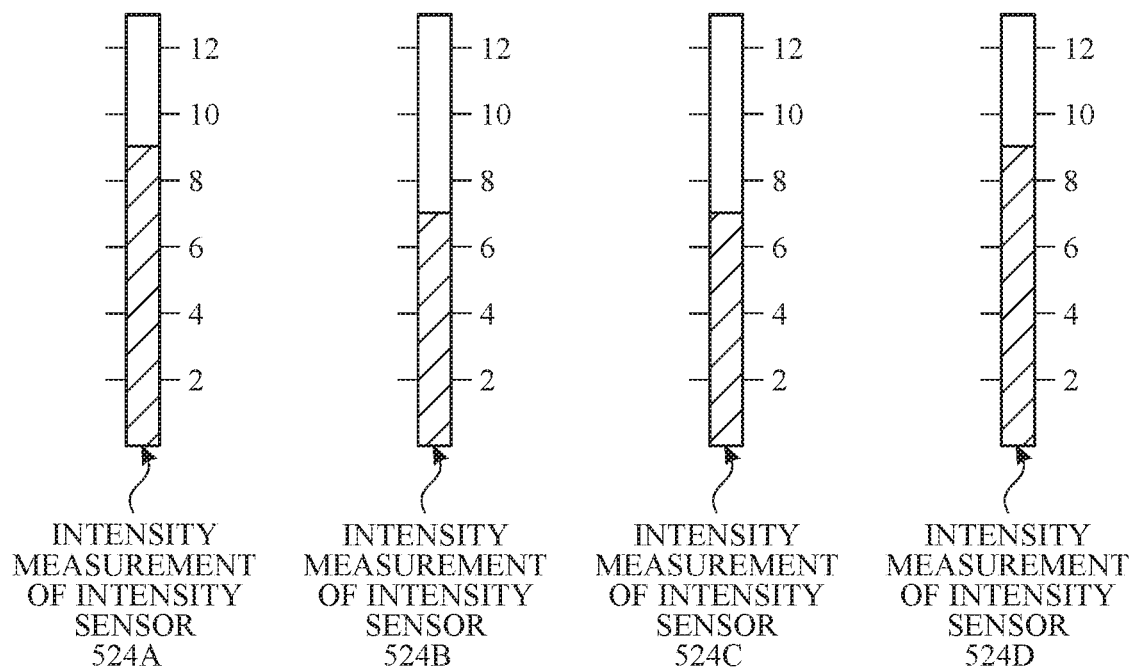
Figure 5D:
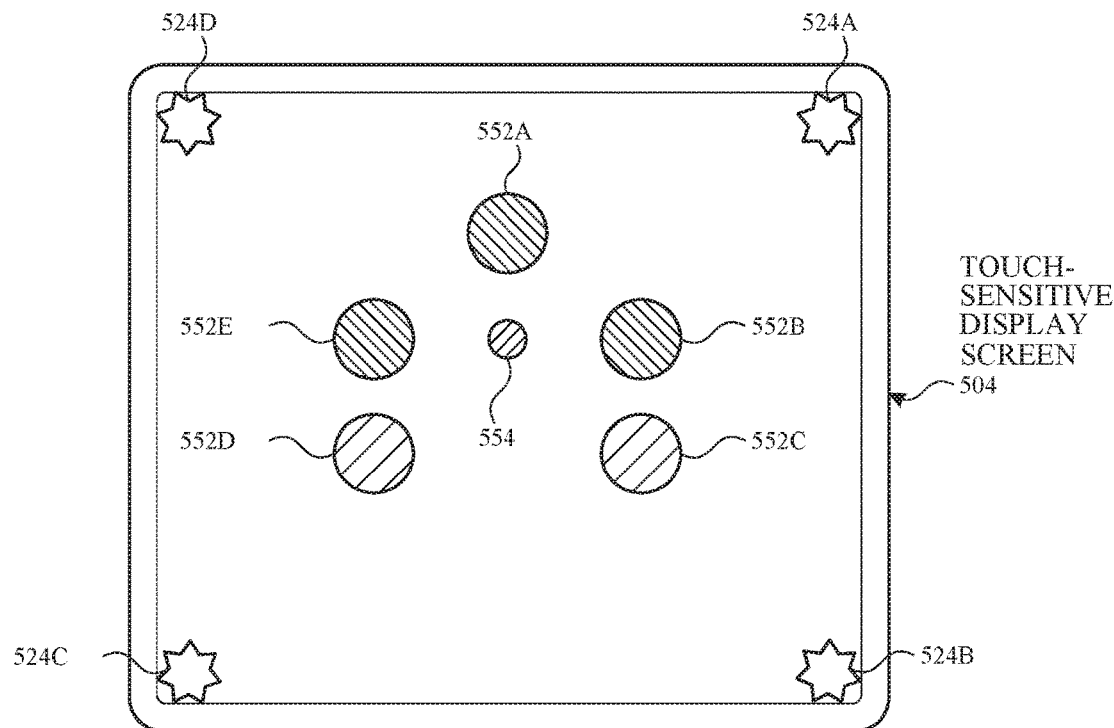
Figure 5D:
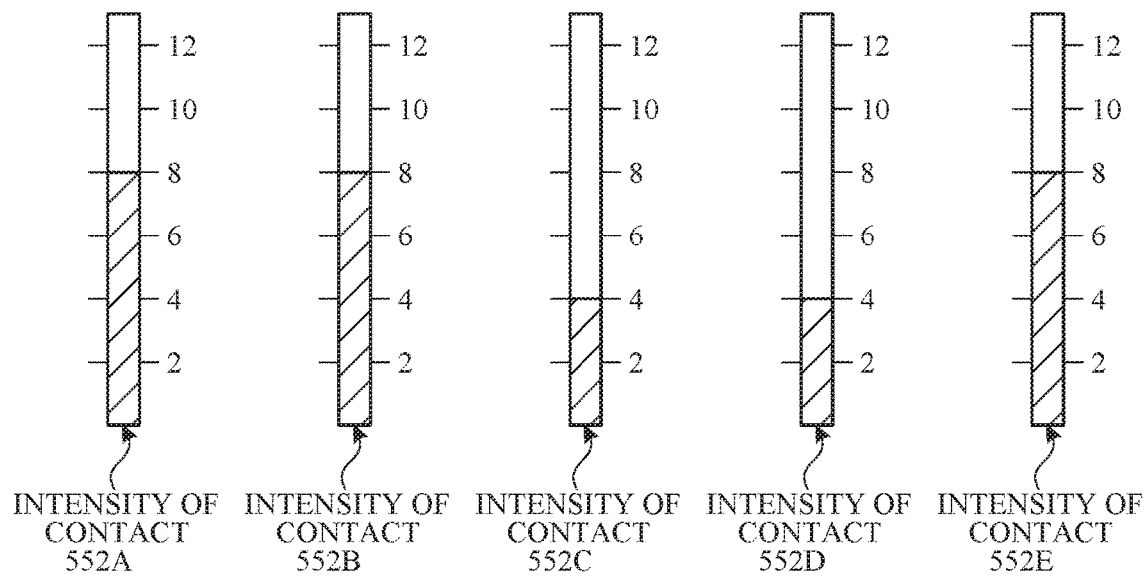

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, Ij=A·(Dj/ΣDi), where Dj is the distance of the respective contact j to the center of force, and ΣDi is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
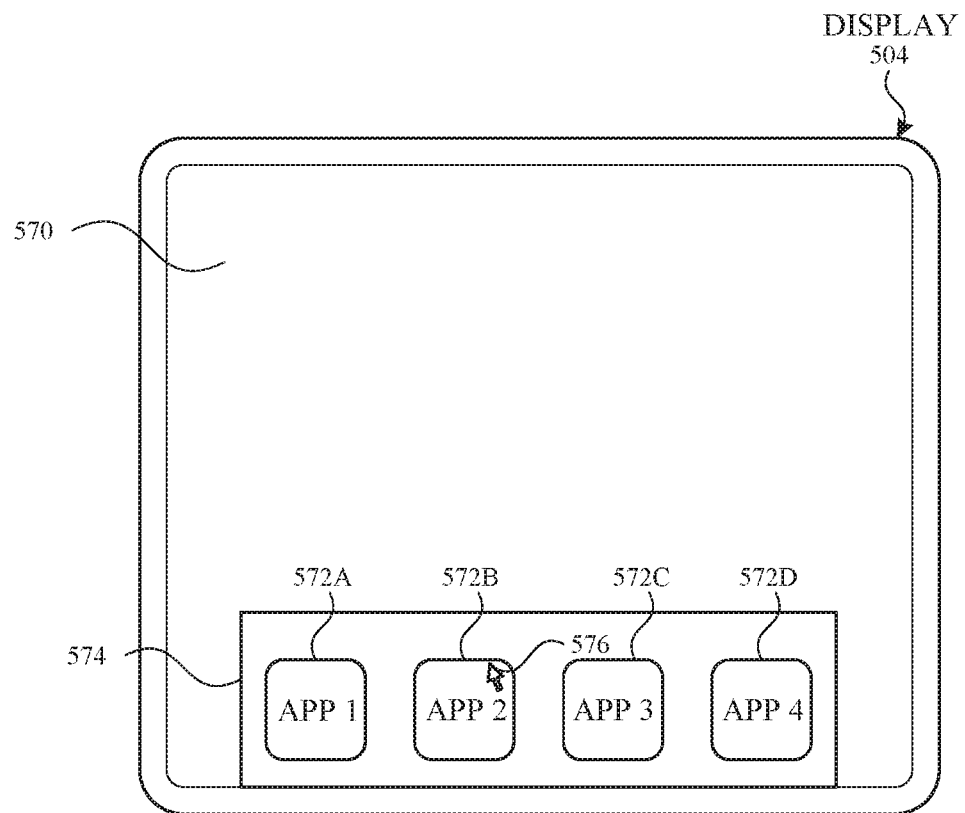
FIGS. 5E-5H illustrate exemplary components and user interfaces of a personal electronic device in accordance with some embodiments.
Figure 5E:
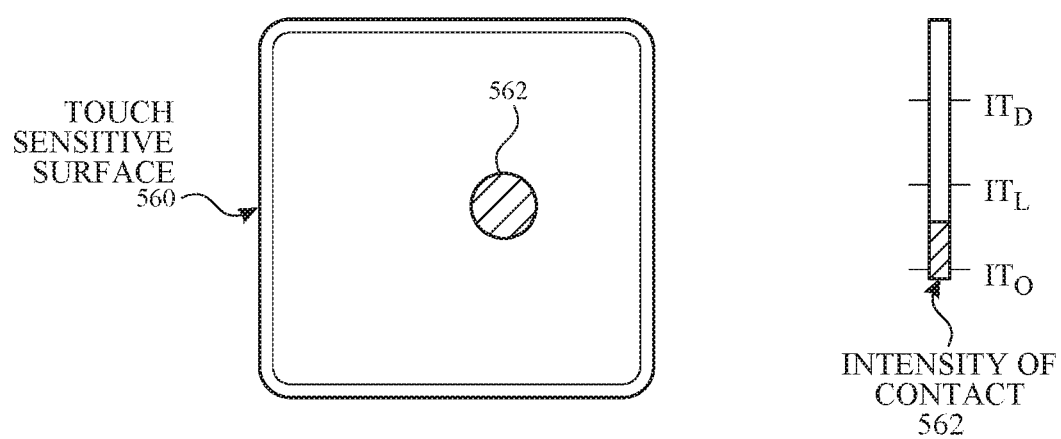
Figure 5F:
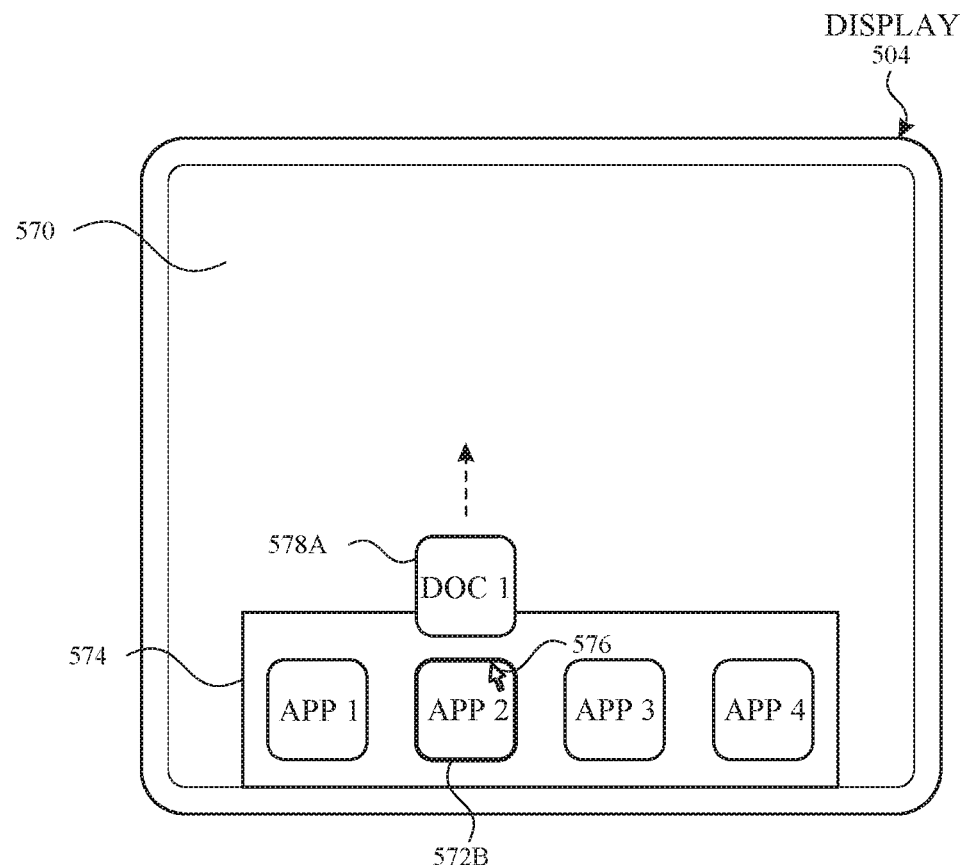
Figure 5F:
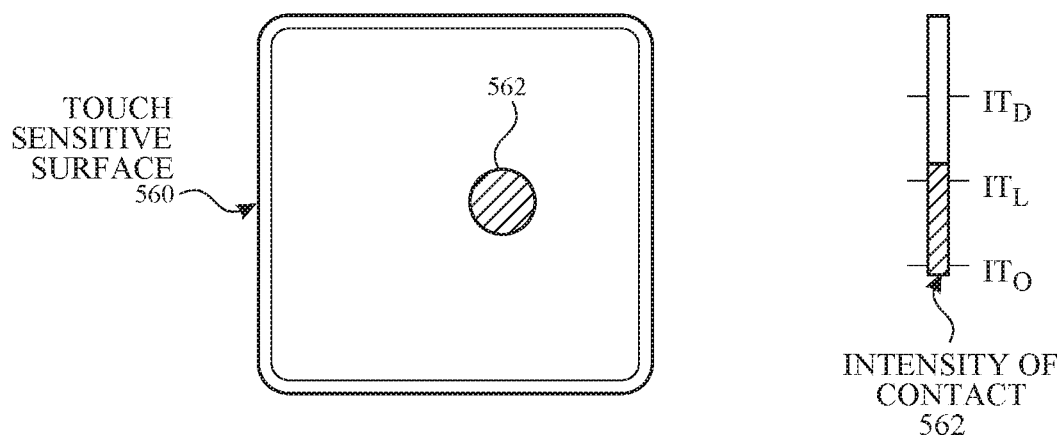
Figure 5G:
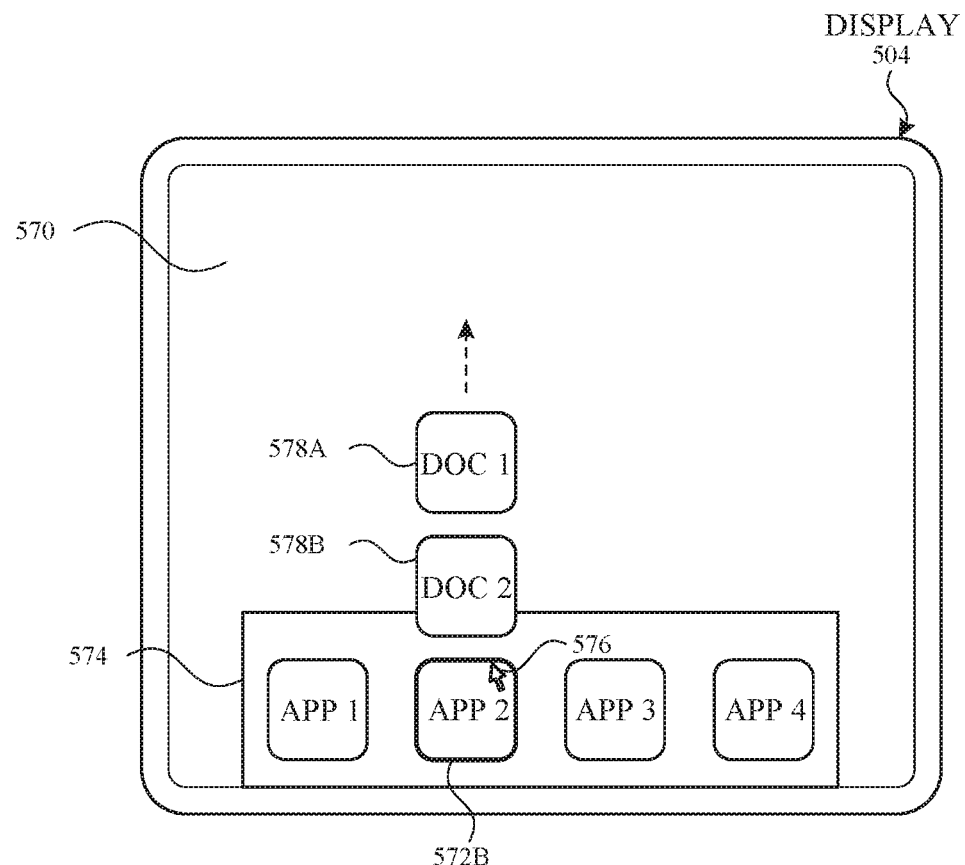
Figure 5G:
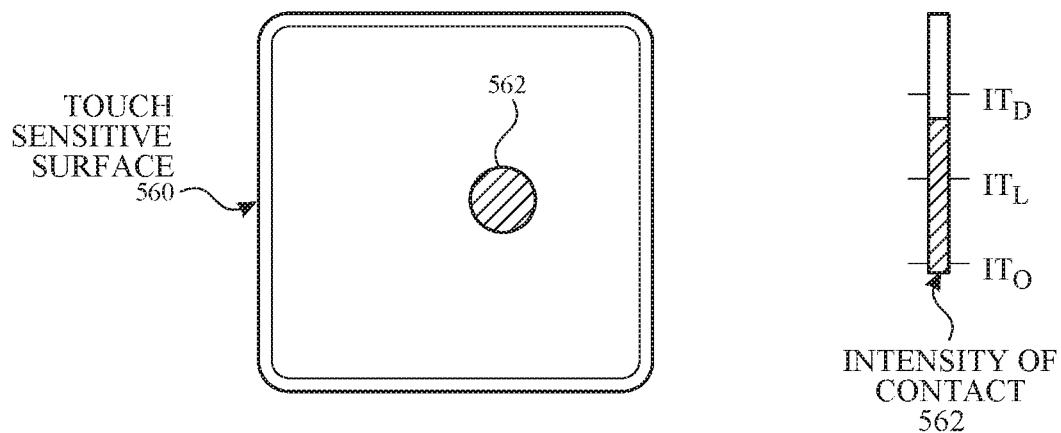
Figure 5H:
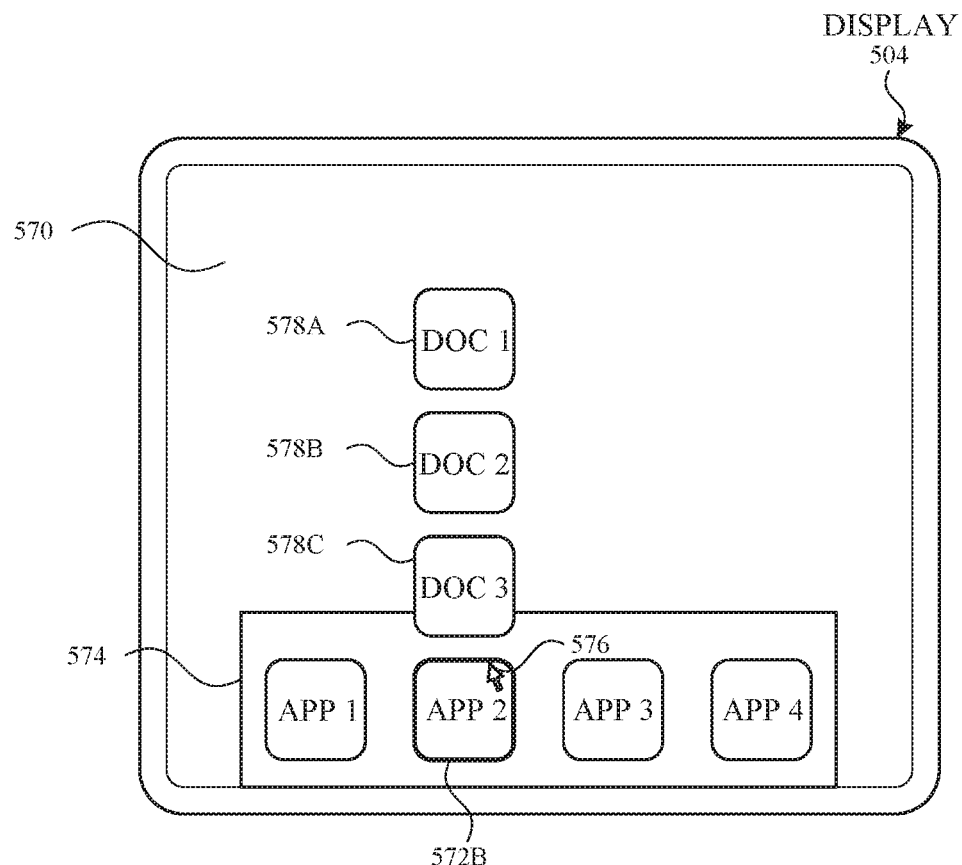
Figure 5H:
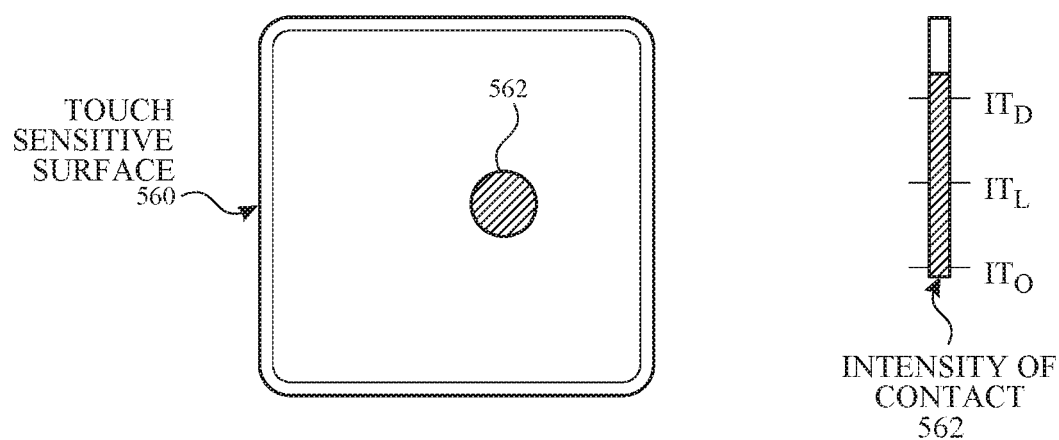

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "$IT_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UP") and associated processes that are implemented on an electronic device, such as portable multifunction device 100, device 300, or device 500.

FIGS. 6A-6K illustrate exemplary user interfaces for providing an upgrade option for accessing an account for a service, in accordance with some embodiments. The user interfaces in these figures are used to illustrate the processes described below, including the processes in FIGS. 7A-7B.

Figure 6A:
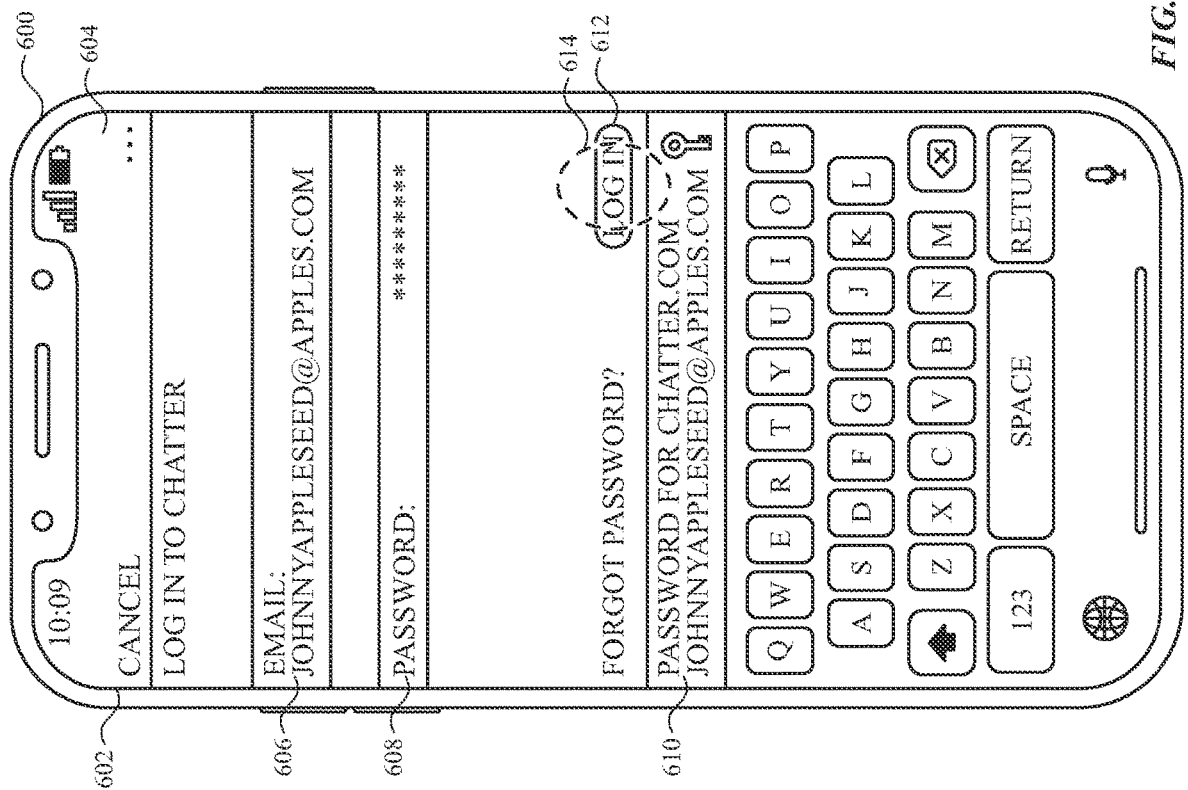
Figure 7B:
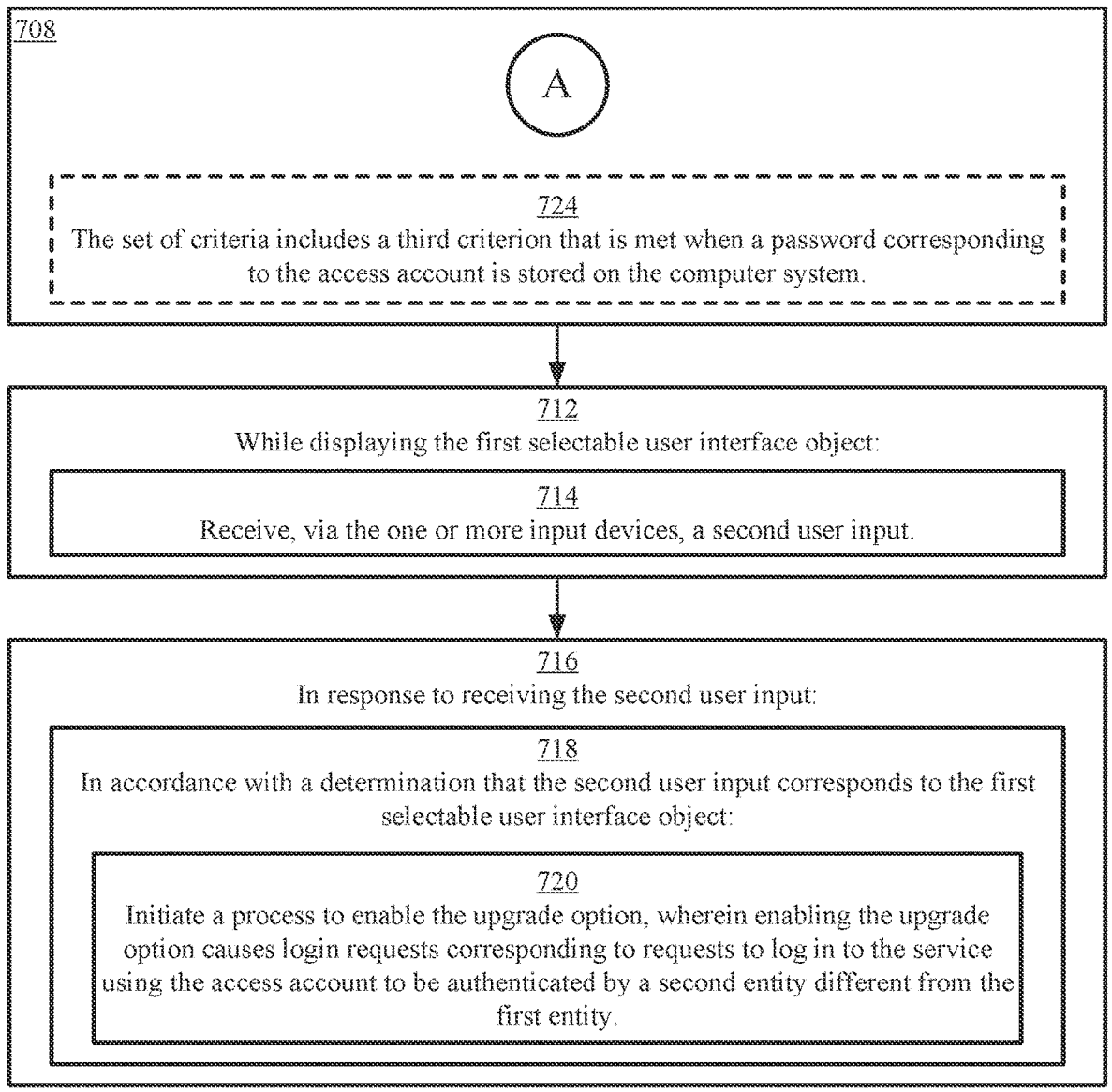

FIG. 6A illustrates electronic device 600 including display device 602 (e.g., integrated with a touch-sensitive surface). In some embodiments, electronic device 600 includes one or more features of device 100, 300, or 500. As shown in FIG. 6A, electronic device 600 displays, via display device 602, a login user interface 604. The login user interface 604 is used for logging into an account on a service using a username and password created for the service (e.g., a username and password that are transmitted to the service and authenticate a user with the service). Accordingly, login user interface 604 includes login fields, including a username field 606 (labeled "email") and a password field 608, for entering username and password information. In FIG. 6A, login user interface 604 corresponds to a service called "Chatter."

Login user interface 604 also includes indication 610, which indicates that login information (e.g., username and password information) for the account "johnnyappleseed@apples.com" on the Chatter service is stored locally on electronic device 600. In some embodiments, indication 610 is selectable by a user, and selection of indication 610 automatically fills in the username field 606 and the password field 608 using the locally stored login information. Login user interface 604 also includes option 612, that is selectable by a user to submit the login information that is entered in the username field 606 and the password field 608 to the service for authentication (e.g., authentication by the service).

At FIG. 6A, while displaying login user interface 604, electronic device 600 detects input 614 at a location corresponding to option 612.

At FIG. 6B, in response to detecting input 614, electronic device 600 replaces display of login user interface 604 with logged in user interface 616. Logged in user interface 616 is indicative of a successful login to the service using the account johnnyappleseed@apples.com. In the example depicted in FIGS. 6A-6B, logged in user interface 616 is indicative of successful authentication of login information (e.g., username and password information) by the Chatter service (e.g., an entity corresponding to the Chatter service).

At FIG. 6B, electronic device 600 has determined that the password associated with the account johnnyappleseed@apples.com on the Chatter service is a weak password (e.g., does not satisfy one or more security criteria). In various embodiments, a password can be determined to be a weak password when the password is not sufficiently complex, contains fewer than a predetermined number of characters, and/or does not include characters of different character types (e.g., alphabetical, numeric, and/or symbolic characters), among other factors. In accordance with a determination that the password associated with the account is a weak password, electronic device 600 displays the logged in user interface 616 in the background, and displays prompt 618 in the foreground. In some embodiments, the prompt 618 is displayed in accordance with a determination that an upgraded sign-in feature has not been enabled for the account on the service, and further in accordance with a determination that the password associated with the account is stored on the computer system 600, and the password associated with the account is a weak password. In some embodiments, logged in user interface 616 and prompt 618 are displayed with particular visual characteristics indicating that logged in user interface 616 is in the background and prompt 618 is in the foreground. For example, logged in user interface 616 can be blurred, darkened, de-saturated, or otherwise visually de-emphasized or visually obscured, while prompt 618 is not visually obscured. Prompt 618 indicates to the user that the password associated with the johnnyappleseed@apples.com account on the Chatter service is a weak password, and recommends that the user take action.

Prompt 618 includes selectable option 620a corresponding to an upgraded sign-in feature. Option 620a is selectable by a user to enable an upgraded sign-in feature for the account on the service (e.g., enable an upgraded sign-in feature for the johnnappledseed@apples.com account on the Chatter service). The upgraded sign-in feature, when enabled, uses an authentication provider, different from the service, that can authenticate a user login request without the user having to enter a username and password for the service. Instead, the authentication provider authenticates the user separately from the service (e.g., by logging into an account with the authentication provider and/or verifying the user's identity with biometric information (e.g., facial recognition, fingerprint recognition) known to the authentication provider), and then the authentication provider communicates with the service to set up and log in to an account with the service, without a user entering a username and password for the service (and without the electronic device transmitting the username or password of the service). In addition, the user can use the same authentication process (e.g., logging into the same account with the authentication provider and/or verifying the user's identity with biometric information known to the authentication provider) with the authentication provider to authenticate for a plurality of different services. For example, a user can enable the upgraded sign-in feature for a first account on a first service (e.g., johnnyappleseed@apples.com on the Chatter service), and can also separately enable the upgraded sign-in feature for a second account on a second service (e.g., johnapples@mail.com on a Shoes service), and can use the same authentication process with the one authentication provider to authenticate for the two accounts on the two services. In some embodiments, the authentication provider is associated with (e.g., manufactures, sells) electronic device 600, and authentication by the authentication provider is performed on the electronic device 600 and/or using authentication information (e.g., biometric information) stored (or accessed) locally on the electronic device 600.

Prompt 618 also includes options 620b and 620c. Option 620b is selectable by a user to change the password for the account to a stronger password (e.g., without enabling the upgraded sign-in feature). In some embodiments, in response to receiving a user input selecting option 620b, electronic device 600 generates or provides a strong password (e.g., a password that satisfies one or more security criteria). Option 620c is selectable by a user to close prompt 618 without changing the password for the account and without enabling the upgraded sign-in feature. In some embodiments, in response to receiving a user input selecting option 620c, electronic device 600 ceases display of prompt 618, and displays logged in user interface 616 in the foreground.

At FIG. 6B, while displaying prompt 618, electronic device 600 detects input 622 at a location corresponding to option 620a.

At FIG. 6C, in response to detecting input 622, electronic device 600 replaces display of prompt 618 with prompt 624. Prompt 624 provides information about the upgraded sign-in feature. Prompt 624 includes option 628 that is selectable by a user to enable the upgraded sign-in feature for an account on a service (e.g., the johnnyappleseed@apples.com account on the Chatter service). Prompt 624 also includes a cancel option 629 that is selectable by a user to close prompt 624 (e.g., without enabling the upgraded sign-in feature). In some embodiments, selection of cancel option 629 causes electronic device 600 to cease display of prompt 624, and display a backgrounded user interface in the foreground (e.g., display logged in user interface 616 in the foreground).

At FIG. 6C, while displaying prompt 624, electronic device 600 detects input 628 at a location corresponding to option 626.

At FIG. 6D, in response to detecting input 628, electronic device 600 replaces display of option 626 with indication 630. Indication 630 indicates that the upgraded sign-in option has been enabled for the johnnyappleseed@apples.com account on the Chatter service. In some embodiments, indication 630 is selectable by a user to close prompt 624, and display a backgrounded user interface in the foreground (e.g., display logged in user interface 616 in the foreground). When the upgraded sign-in option is enabled, if the user attempts to log into the johnnyappleseed@apples.com account on the Chatter service using electronic device 600, rather than entering username and password information for the Chatter service (as was the case in FIG. 6A), the user is, optionally, asked to enter authentication information corresponding to the authentication provider (and not the service). For example, the user may be asked to enter a username and password for the authentication provider (rather than the service), or the user may be asked to enter biometric information (e.g., a facial scan or fingerprint scan) that can be authenticated by electronic device 600 and/or the authentication provider. Once the user is authenticated, the authentication provider (or electronic device 600) communicates with the service to log the user into the service using the johnnyappleseed@apples.com account.

At FIG. 6E, electronic device 600 displays, via display device 602, a settings user interface 634 corresponding to an account on a service. In the example shown in FIG. 6E, settings user interface 634 corresponds to an account on a "Shoes" service. In some embodiments, the settings user interface 634 is accessible within an application associated with the service (e.g., an application installed on electronic device 600). Settings user interface 634 includes selectable options 636a-h that are selectable by a user to change various user settings or preferences for the account on the service. For example, in FIG. 6E, a user can use options 636a-h to change an email address associated with the account on the Shoes service (option 636a), a mobile number associated with the account on the Shoes service (option 636b), a password associated with the account on the Shoes service (option 636c), shipping information associated with the account on the Shoes service (option 636e), payment information associated with the account on the Shoes services (option 636f), a language setting associated with the account on the Shoes service (option 636g), or a shoe size associated with the account on the Shoes service (option 636h). Settings user interface 634 also includes option 636d, that is selectable by a user to initiate a process to enable an upgraded sign-in feature for the account on the Shoes service, as described above with reference to FIGS. 6A-6D. In some embodiments, if the upgraded sign-in feature is already enabled for the account on the Shoes service, option 636d may be replaced in the settings user interface 634 with a different option to disable (e.g., turn off) the upgraded sign-in feature so that a user signs into the Shoes service using a username and password authenticated by the Shoes service. In some embodiments, the option to disable the upgraded sign-in feature is displayed in accordance with a determination that the upgraded sign-in feature is enabled, and independent of whether a password for the account is stored on the device or meets one or more security requirements. In some embodiments, enabling the upgraded sign-in feature does not affect other settings for the account in the service.

At FIG. 6E, while displaying settings user interface 634, electronic device 600 detects input 638 at a location corresponding to option 636d.

At FIG. 6F, in response to detecting input 638, electronic device 600 displays prompt 640. Functionality of prompt 640 is substantially similar to prompt 624 of FIGS. 6C-6D. Prompt 640 is partially overlaid on settings user interface 634, and prompt 640 is displayed in the foreground while settings user interface 634 is displayed in the background. In some embodiments, settings user interface 634 and prompt 640 are displayed with particular visual characteristics indicating that settings user interface 634 is in the background and prompt 640 is in the foreground. For example, settings user interface 634 can be blurred, darkened, de-saturated, or otherwise visually de-emphasized or visually obscured, while prompt 640 is not visually obscured. Like prompt 624 of FIG. 6D, prompt 640 includes option 642 that is selectable to enable the upgraded sign-in feature for the account on the Shoes service.

At FIG. 6G, electronic device 600 displays, via display device 602, a security recommendations user interface 644 corresponding to electronic device 600. Security recommendations user interface 644 includes various recommendations for improving security on electronic device 600. In some embodiments, security recommendations user interface 644 is accessible via an operating system menu corresponding to an operating system of the electronic device 600 (e.g., rather than corresponding to a particular application installed on the electronic device 600). In the example shown in FIG. 6G, electronic device 600 has determined that a password associated with an account on the Chatter.com service is a weak password (e.g., based on one or more security criteria). As a result of that determination, electronic device 600 includes within security recommendations user interface 644 a recommendation 646 to improve security for the account on the Chatter.com service. Recommendation 646 includes an option 646a that is selectable to initiate a process to enable an upgraded sign-in feature for the account on the Chatter.com service, as described above with reference to FIGS. 6A-6D, and an option 646b that is selectable to initiate a process to create a stronger password for the account on the Chatter.com service. In some embodiments, in response to receiving a user input selecting option 646b, electronic device 600 generates or provides a strong password (e.g., a password that satisfies one or more security criteria) for the account on the Chatter.com service.

In the example shown in FIG. 6G, electronic device 600 has also determined that a password associated with an account on the Shopping.com service is a weak password (e.g., based on one or more security criteria). As a result of that determination, electronic device 600 includes within security recommendations user interface 644 a recommendation 648 to improve security for the account on the Shopping.com service. Recommendation 648 includes an option 648a that is selectable to initiate a process to enable an upgraded sign-in feature for the account on the Shopping.com service, as described above with reference to FIGS. 6A-6D, and an option 648b that is selectable to initiate a process to create a stronger password for the account on the Shopping.com service. In some embodiments, in response to receiving a user input selecting option 648b, electronic device 600 generates or provides a strong password (e.g., a password that satisfies one or more security criteria) for the account on the Shopping.com service.

At FIG. 6G, while displaying security recommendations user interface 644, electronic device 600 detects input 650 at a location corresponding to option 646a.

At FIG. 6H, in response to detecting input 650, electronic device 600 displays prompt 652. Functionality of prompt 652 is substantially similar to prompt 624 of FIGS. 6C-6D. Prompt 652 is partially overlaid on security recommendations user interface 644, and prompt 652 is displayed in the foreground while security recommendations user interface 644 is displayed in the background. In some embodiments, security recommendations user interface 644 and prompt 652 are displayed with particular visual characteristics indicating that security recommendations user interface 644 is in the background and prompt 652 is in the foreground. For example, security recommendations user interface 644 can be blurred, darkened, de-saturated, or otherwise visually de-emphasized or visually obscured, while prompt 652 is not visually obscured. Like prompt 624 of FIG. 6D, prompt 652 includes option 654 that is selectable to enable the upgraded sign-in feature for the account on the Chatter.com service.

At FIG. 6I, electronic device 600 displays, via display device 602, a password reset user interface 656 corresponding to a service. The password reset user interface 656 allows a user to reset a password for an account on the service. Password reset user interface 656 includes an input field 658 for a user to enter account information identifying the account on the service for which the user would like to reset a password, option 660 that is selectable by a user to submit a password reset request, and option 662 that is selectable by a user to navigate to a login user interface to log in to the service.

At FIG. 6I, while displaying password reset user interface 656, electronic device 600 detects input 664 at a location corresponding to option 660. In response to input 664, electronic device 600 transmits a password reset request to the service. In response to the password reset request, the service transmits a communication to the user (e.g., an email, a text message) indicating that the service has received the password reset request.

At FIG. 6J, electronic device 600 displays communication 668 that was transmitted to the user in response to the user's password reset request. In some embodiments, electronic device 600 displays communication 668 in response to one or more user inputs navigating to the communication 668 (e.g., within a web browser, within an email application, within a messaging application). Communication 668 includes option 670 that is selectable by a user to reset a password associated with an account on the service. Communication 668 also includes option 672 that is selectable by a user to enable an upgraded sign-in option for the account on the service, as discussed above with reference to FIGS. 6A-6D.

At FIG. 6J, while displaying communication 668, electronic device 600 detects input 674 at a location corresponding to option 672.

Figure 6K:
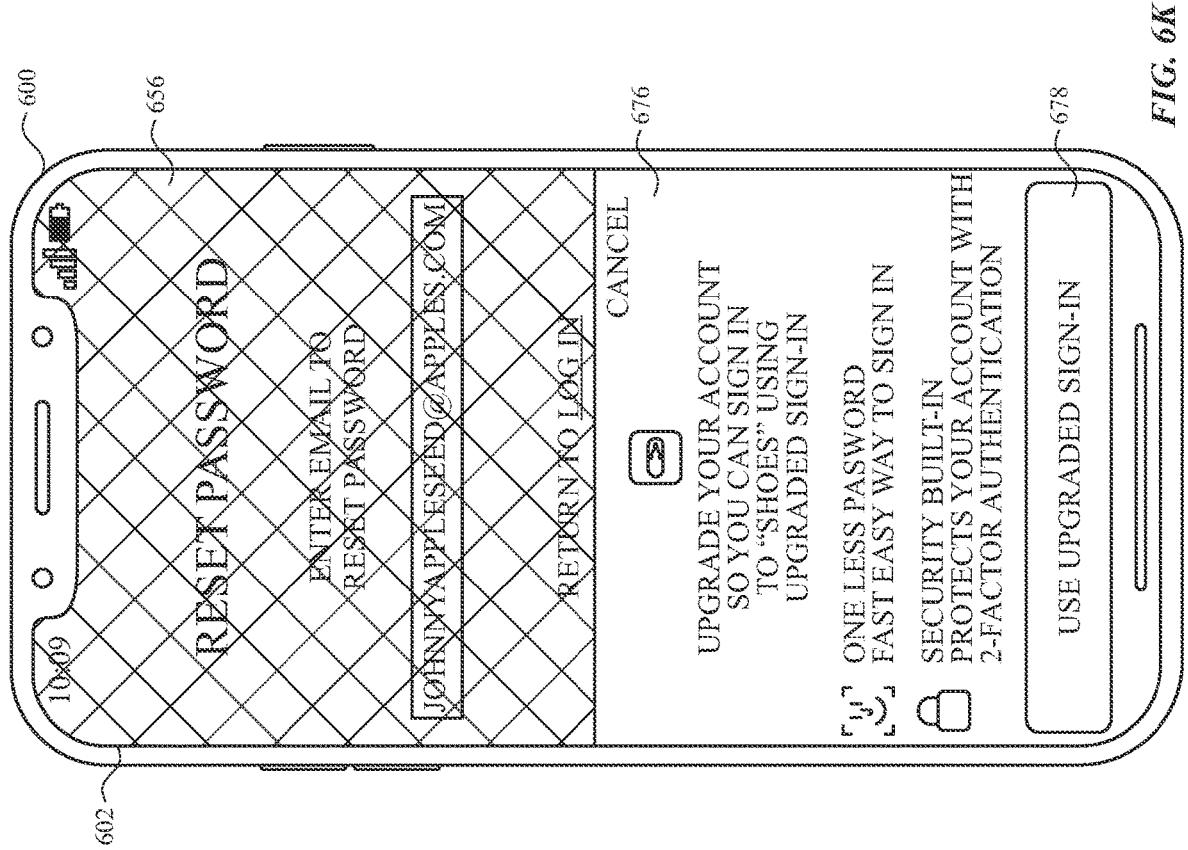

At FIG. 6K, in response to detecting input 674, electronic device 600 displays prompt 676. Functionality of prompt 676 is substantially similar to prompt 624 of FIGS. 6C-6D. In some embodiments, in response to detecting input 674, electronic device displays prompt 676 overlaid on reset password user interface 656. In some embodiments, displaying prompt 676 overlaid on reset password user interface 656 includes, in response to detecting input 674, automatically navigating from the communication 668 to an application within which the reset password user interface 656 is presented (e.g., an application associated with the service, a browser application). Prompt 676 is partially overlaid on reset password user interface 656, and prompt 676 is displayed in the foreground while reset password user interface 656 is displayed in the background. In some embodiments, reset password user interface 656 and prompt 676 are displayed with particular visual characteristics indicating that reset password user interface 656 is in the background and prompt 676 is in the foreground. For example, reset password user interface 656 can be blurred, darkened, de-saturated, or otherwise visually de-emphasized or visually obscured, while prompt 676 is not visually obscured. Like prompt 624 of FIG. 6D, prompt 676 includes option 678 that is selectable to enable the upgraded sign-in feature for the account on the service.

FIGS. 7A-7B is a flow diagram illustrating a method for accessing an account for a service using an electronic device in accordance with some embodiments. Method 700 is performed at a computer system (e.g., 100, 300, 500, 600) that is in communication with a display generation component and one or more input devices. Some operations in method 700 are, optionally, combined, the orders of some operations are, optionally, changed, and some operations are, optionally, omitted.

As described below, method 700 provides an intuitive way for accessing an account for a service. The method reduces the cognitive burden on a user by reducing the amount of information that needs to be entered to access an account, and allowing for a single authentication process that can be applied to multiple accounts in multiple services, thereby creating a more efficient human-machine interface. For battery-operated computing devices, enabling a user to enter less information conserves power and increases the time between battery charges.

The computer system displays (702), via the display generation component, a user interface (e.g., 604, 634, 644, 656) (e.g., login user interface, settings user interface, security recommendations user interface) that includes information associated with a service (e.g., a "Chatter" service in FIGS. 6A-6D, a "Shoes" service in FIGS. 6E-6F, a "Chatter.com" service or "Shopping.com" service in FIG. 6G, a "Shoes" service in FIGS. 6I-6K) provided by a first entity.

While displaying the user interface that includes information associated with the service provided by the first entity (704), the computer system receives (706), via the one or more input devices, a first user input (e.g., 614, 622, 638, 650, 660, 664, 674) (e.g., an input requesting to transmit login information of an access account (e.g., login/password) for the service to the first entity; an input corresponding to an upgraded sign-in option for the service (e.g., within a settings user interface for the service, within a security recommendations user interface)).

In response to receiving the first user input (708), and in accordance with a determination that a set of criteria is satisfied, wherein the set of criteria includes a first criterion that is met when login requests for an access account of the service are configured to be authenticated by the first entity (and alternatively, or in addition, are not configured to be authenticated by the second entity), the computer system displays (710), via the display generation component, a first selectable user interface object (e.g., button, hyperlink) (e.g., 620a, 626, 642, 654, 672, 678) corresponding to an upgrade option (e.g., an "upgraded sign-in" option) wherein the upgrade option is associated with the access account. Displaying the first selectable user interface object corresponding to the upgrade option in response to receiving the first user input and in accordance with a determination the set of criteria is satisfied enables a user to quickly enable the upgrade option, thereby reducing the number of inputs needed for enabling the upgrade option. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

While displaying the first selectable user interface object (712), the computer system receives (714), via the one or more input devices, a second user input.

In response to receiving the second user input (716), and in accordance with a determination that the second user input corresponds to (e.g., selection of, tap on) the first selectable user interface object (718) (e.g., 622, 628, 674, input on "Use Upgraded Sign-In" option 642 in FIG. 6F, input on "Use Upgraded Sign-In" option 654 in FIG. 6H, input on "Use Upgraded Sign-In" option 678 in FIG. 6K), the computer system initiates (720) a process to enable the upgrade option, wherein enabling the upgrade option causes login requests (e.g., login requests received at the computer system, login requests received by the computer system) corresponding to requests to log in to the service using the access account to be authenticated by a second entity (e.g., an entity associated with the computer system) (e.g., by a device (e.g., a computer system) associated with the second entity) different from the first entity. Initiating the process to enable the upgrade option enhances security by enabling authentication by a second entity (e.g., a trusted entity, a more secure entity) different from the first entity. Providing improved security enhances the operability of the device and makes the user-device interface more efficient (e.g., by restricting unauthorized access) which, additionally, reduces power usage and improves battery life of the device by limiting the performance of restricted operations.

In some embodiments, after enabling the upgrade option, authentication is performed by the second entity without authentication by the first entity. In some embodiments, after enabling the upgrade option, authentication is performed by the second entity in addition to authentication by the first entity.

In some embodiments, a second selectable user interface object corresponding to a second option (different from the upgrade option) is concurrently displayed with the first selectable user interface object. In response to receiving the second user input and in accordance with a determination that the second user input corresponds to the second selectable user interface object, the computer system foregoes initiating the process to enable the upgrade option and maintains configuration of the access account to be authenticated by the first entity.

In some embodiments, prior to enabling the upgrade option, login requests corresponding to requests to log in to the service using the access account are authenticated by the first entity based on a username (e.g., 606) and a password (e.g., 608) provided to the first entity (e.g., by the first entity comparing the username and password to a stored username and a stored password, by the first entity comparing the username to a stored username and comparing the password to a hash-modified version of the password) (e.g., without authentication performed by the second entity). In some embodiments, after enabling the upgrade option, login requests corresponding to requests to log in to the service using the access account comprise authentication by the second entity performed at the computer system (e.g., 600) (e.g., authentication is performed by one or more programs stored on the computer system, the computer system provides the first entity with a confirmation of authentication for the access account) (e.g., based on biometric information received at and/or authenticated by the computer system). In some embodiments, the computer system is associated with (e.g., manufactured by, sold by) the second entity. In some embodiments, after enabling the upgrade option, authentication is performed by the second entity without authentication by the first entity. In some embodiments, after enabling the upgrade option, authentication is performed by the second entity in addition to authentication by the first entity.

In some embodiments, prior to enabling the upgrade option, the computer system receives a first request to log in to the service using the access account (e.g., receive a user input on a login user interface). In response to receiving the first request to log in, and in accordance with a determination that the upgrade option is not enabled (e.g., for the access account), the computer system transmits login information (e.g., username and password information) to the first entity; and, in accordance with a determination that the login information has been authenticated by the first entity, the computer system displays a logged in user interface indicative of a successful login to the service using the access account. In some embodiments, after enabling the upgrade option, the computer system receives a second request to log in to the service using the access account (e.g., receive a user input on a login user interface); in response to receiving the second request to log in, and in accordance with a determination that the upgrade option is enabled (e.g., for the access account), the computer system authenticates login information (e.g., username and password information, biometric information) at the computer system; and, in accordance with a determination that the login information has been authenticated at the computer system (e.g., by the second entity), the computer system displays the logged in user interface indicative of a successful login to the service using the access account.

In some embodiments, the upgrade option corresponds to a particular account (e.g., the access account), such that enabling the upgrade option for a first account does not enable the upgrade option for another account without additional user input.

Enabling the upgrade option enhances security by enabling authentication by a second entity (e.g., a trusted entity, a more secure entity) different from the first entity. Providing improved security enhances the operability of the device and makes the user-device interface more efficient (e.g., by restricting unauthorized access) which, additionally, reduces power usage and improves battery life of the device by limiting the performance of restricted operations.

In some embodiments, the set of criteria includes a second criterion that is met when a password corresponding to the access account does not satisfy one or more security criteria (722) (e.g., prompt 618, recommendations 646, 648) (e.g., the first selectable user interface object is displayed in accordance with a determination that the password corresponding to the access account does not satisfy one or more security criteria). In some embodiments, displaying the first selectable user interface object further comprises concurrently displaying a second selectable user interface object corresponding to an option to create a different password and a third selectable user interface object corresponding to an option to forgo the upgrade option and maintain a current password.

Displaying the first selectable user interface object corresponding to the upgrade option in accordance with a determination that a password corresponding to the access account does not satisfy one or more security criteria enhances security by providing the user with information that their current password does not meet the security criteria and providing an easy way to secure the access account with a more secure way to log into the access account. Providing improved security enhances the operability of the device and makes the user-device interface more efficient (e.g., by restricting unauthorized access) which, additionally, reduces power usage and improves battery life of the device by limiting the performance of restricted operations.

In some embodiments, the password corresponding to the access account does not satisfy the one or more security criteria when the password is not sufficiently complex, contains fewer than a predetermined number of characters, and/or does not include characters of different character types (e.g., alphabetical, numeric, and/or symbolic characters).

In some embodiments, the set of criteria includes a third criterion that is met when a password corresponding to the access account is stored (e.g., locally) on the computer system (724) (e.g., as indicated by indication 610) (e.g., the first selectable user interface object is displayed in accordance with a determination that the password corresponding to the access account is stored on the computer system). In some embodiments, the third criterion is met when a username (e.g., email address, phone number, alias) and a password corresponding to the access account are stored on the computer system.

Displaying the first selectable user interface object corresponding to the upgrade option in accordance with a determination that a password corresponding to the access account is stored on the computer system enhances security by providing the user with any easy way to secure the access account with a more secure way to log into the access account by, for example, enabling authentication by a second entity (e.g., a trusted entity, a more secure entity) different from the first entity. Providing improved security enhances the operability of the device and makes the user-device interface more efficient (e.g., by restricting unauthorized access) which, additionally, reduces power usage and improves battery life of the device by limiting the performance of restricted operations.

In some embodiments, the user interface is a login user interface (e.g., 604) (e.g., a login user interface presented within and/or accessible within an application corresponding to the service provided by the first entity, a login user interface presented within and/or accessible within a website corresponding to the service provided by the first entity) for logging in to the service provided by the first entity. In some embodiments, the login user interface includes a first field for receiving a username (e.g., email address, phone number, alias) and a second field for receiving a password. In some embodiments, the first user input (e.g., 614) corresponds to a log in option (e.g., 612) (e.g., a selectable user interface object (e.g., log in button)) and is indicative of a request to log in to the service provided by the first entity using the access account (726) (e.g., the first user input corresponds to submission of a username and password to log in to the service provided by the first entity using the access account). In some embodiments, the first selectable user interface object is displayed within an information user interface that overlays (e.g., partially) the login user interface. In some embodiments, the first selectable user interface object is displayed within an information user interface that overlays (e.g., partially) a logged in user interface that is provided by the first entity upon successful login to the service.

Displaying the first selectable user interface object corresponding to the upgrade option in response to receiving a first user input corresponding to a log in option indicative of a request to log in to the service enables a user to quickly enable the upgrade option, thereby reducing the number of inputs needed for enabling the upgrade option. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the user interface is a settings user interface (e.g., 634) corresponding to the service provided by the first entity (e.g., a settings user interface presented within and/or accessible within an application corresponding to the service provided by the first entity, a settings user interface presented within and/or accessible within a website corresponding to the service provided by the first entity) that includes one or more selectable options (e.g., 636*a-h*) (e.g., one or more selectable user interface objects) pertaining to user preferences for the service provided by the first entity (e.g., one or more selectable options pertaining to user preferences within an application corresponding to the service provided by the first entity). In some embodiments, the first user input (e.g., 638) corresponds to a first selectable option (e.g., 636*d*) in the settings user interface (e.g., the first selectable option corresponds to the upgrade option). In some embodiments, the settings user interface corresponds to the access account and includes one or more selectable options pertaining to user preferences for the access account within the service provided by the first entity. In some embodiments, the first selectable user interface object is displayed within an information user interface that overlays (e.g., partially) the settings user interface.

Displaying the first selectable user interface object within a settings user interface enables a user to quickly enable the upgrade option, thereby reducing the number of inputs needed for enabling the upgrade option. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the user interface is a password reset user interface (e.g., 656) (e.g., a password reset user interface presented within and/or accessible within an application corresponding to the service provided by the first entity, a password reset user interface presented within and/or accessible within a website corresponding to the service provided by the first entity) for resetting a password on the service. In some embodiments, the first user input (e.g., 664) is indicative of a request to reset the password associated with the access account (e.g., selection of a reset option (e.g., selectable user interface object (e.g., a reset button)). In some embodiments, the first selectable user interface object (e.g., a button, a hyperlink) is displayed within a communication (e.g., email, text message) that is provided to the user in response to the first user input indicative of a request to reset the password associated with the access account. In some embodiments, displaying the first selectable user interface object comprises displaying the first selectable user interface object in response to receiving a third user input corresponding to a request to access (e.g., view, display) the communication (e.g., the first user input causes a communication (e.g., an email, a text message) that includes the first selectable user interface object to be transmitted and/or provided to the user, and the third user input corresponds to a request to access or view the communication. In some embodiments, displaying the first selectable user interface object further comprises concurrently displaying a second selectable user interface object corresponding to an option to reset the password associated with the access account (e.g., a communication includes both the first selectable user interface object corresponding to the upgrade option and the second selectable user interface object corresponding to the option to reset the password associated with the access account). In some embodiments, the first selectable user interface object is displayed within an information user interface that overlays (e.g., partially) the password reset user interface.

Displaying the first selectable user interface object corresponding to the upgrade option in response to receiving a first user input indicative of a request to reset a password associated with the access account enables a user to quickly enable the upgrade option, thereby reducing the number of inputs needed for enabling the upgrade option. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the user interface is a security recommendations user interface (e.g., 644) (e.g., a security recommendations user interface corresponding to (e.g., provided within, accessible within) an operating system of the computer system) that includes one or more selectable options (e.g., 646a-b, 648a-b) for a user pertaining to device security for the computer system (e.g., 600). In some embodiments, the first user input (e.g., 650) corresponds to selection of a first selectable option (e.g., 646a) (e.g., a selectable user interface object) in the security recommendations user interface (e.g., the first selectable option corresponds to the upgrade option). In some embodiments, the security recommendations user interface includes one or more security recommendations for the user to improve device security. In some embodiments, the security recommendations user interface identifies one or more passwords that do not satisfy one or more security criteria. In some embodiments, a password does not satisfy the one or more security criteria when the password is not sufficiently complex, contains fewer than a predetermined number of characters, and/or does not include characters of different character types (e.g., alphabetical, numeric, and/or symbolic characters). In some embodiments, the security recommendations user interface provides a recommendation to change one or more passwords that do not satisfy one or more security criteria. In some embodiments, the first selectable user interface object is displayed within an information user interface that overlays (e.g., partially) the security recommendations user interface.

Displaying the first selectable user interface object corresponding to the upgrade option within a security recommendations user interface enhances security by providing the user with an easy way to secure an access account with a more secure way to log into the access account. Displaying the first selectable user interface object corresponding to the upgrade option within a security recommendations user interface can also enhance security by providing a single user interface where multiple accounts can be identified as benefiting from upgrading to a more secure login procedure. Providing improved security enhances the operability of the device and makes the user-device interface more efficient (e.g., by restricting unauthorized access) which, additionally, reduces power usage and improves battery life of the device by limiting the performance of restricted operations.

In some embodiments, initiating the process to enable the upgrade option includes: displaying an information user interface (e.g., 618, 624, 640, 652, 676) (e.g., partially (not fully) overlaid on a user interface provided by the first entity) that includes an option (e.g., 620a, 628, 642, 654, 678) that, when selected, requests use of biometric information (e.g., fingerprint authentication, facial recognition) by the second entity to authenticate the access account to log in to the service. In some embodiments, enabling the upgrade option initiates a process to cause login requests corresponding to requests to log in to the service using the access account to be authenticated by the second entity based on authentication of biometric information (e.g., fingerprint, facial recognition) by the computer system.

Prompting a user to enable authentication of login requests using biometric information enhances security by providing the user with an easy way to secure an access account with a more secure way to log into the access account and helping to avoid unauthorized access without providing the appropriate biometric information. Providing improved security enhances the operability of the device and makes the user-device interface more efficient (e.g., by restricting unauthorized access) which, additionally, reduces power usage and improves battery life of the device by limiting the performance of restricted operations.

In some embodiments, after initiating the process to enable the upgrade option (e.g., and after enabling the upgrade option): the computer system receives, via the one or more input devices, a third user input (e.g., a user input corresponding to a downgrade option within a settings user interface). In some embodiments, in response to receiving the third user input, and in accordance with a determination that a second set of criteria is satisfied, wherein the second set of criteria includes a fourth criterion that is met when the upgrade option is enabled, the computer system displays, via the display generation component, a second selectable user interface object corresponding to a downgrade option (e.g., a "downgrade" option may replace "upgrade" option 636d in settings user interface 634), wherein the downgrade option is associated with the access account, and enabling the downgrade option disables the upgrade option, and initiates a process for causing login requests corresponding to requests to log in to the service using the access account to be authenticated by the first entity (e.g., without authentication by the second entity). In some embodiments, the downgrade option is presented within a settings user interface corresponding to the service provided by the first entity (e.g., a settings user interface presented within and/or accessible within an application corresponding to the service provided by the first entity, a settings user interface presented within and/or accessible within a website corresponding to the service provided by the first entity). In some embodiments, when the upgrade option is enabled, the upgrade option (e.g., a selectable user interface object corresponding to the upgrade option) is replaced within the settings interface by the downgrade option (e.g., a selectable user interface object corresponding to the upgrade option). In some embodiments, when the downgrade option is enabled, the downgrade option (e.g. a selectable user interface object corresponding to the downgrade option) is replaced within the settings user interface by the upgrade option (e.g., a selectable user interface object corresponding to the upgrade option).

Displaying second first selectable user interface object corresponding to the downgrade option in response to receiving the third user input and in accordance with a determination the second set of criteria is satisfied enables a user to quickly disable the upgrade option, thereby reducing the number of inputs needed for disabling the upgrade option. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, enabling the upgrade option comprises maintaining one or more additional settings (e.g., settings 636a-636h in FIG. 6E) associated with the access account (e.g., enabling the upgrade option does not cause changes to other user preferences). In some embodiments, account settings (e.g., such as those configured by a user of the access account) of the access account do not change when enabling the upgrade option. For example, preferred display settings for the service, user name information, profile information, and/or mailing address information of the access account are maintained.

Maintaining one or more additional settings while enabling the upgrade option allows a user to maintain their preferred settings without additional user inputs even after enabling the upgrade option. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to access an account for a service. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve the process for setting up an account for a service. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of user login information, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A computer system, comprising:
one or more processors, wherein the computer system is in communication with a display generation component and one or more input devices; and
memory storing one or more programs configured to be executed by the one or more processors, the one or more programs including instructions for:
displaying, via the display generation component, a user interface that includes information associated with a service provided by a first entity;
while displaying the user interface that includes information associated with the service provided by the first entity, receiving, via the one or more input devices, a first user input directed to the user interface;
in response to receiving the first user input directed to the user interface, and in accordance with a determination that a set of criteria is satisfied, wherein the set of criteria includes a first criterion that is met when login requests for an access account of the service are configured to be authenticated by the first entity, displaying, via the display generation component, a first selectable user interface object corresponding to an upgrade option, wherein the upgrade option is associated with the access account;
while displaying the first selectable user interface object, receiving, via the one or more input devices, a second user input; and
in response to receiving the second user input:
in accordance with a determination that the second user input corresponds to the first selectable user interface object, initiating a process to enable the upgrade option, wherein enabling the upgrade option causes login requests corresponding to requests to log in to the service using the access account to be authenticated by a second entity different from the first entity without authentication by the first entity of username and password information associated with the access account.

2. The computer system of claim 1, wherein,
prior to enabling the upgrade option, login requests corresponding to requests to log in to the service using the access account are authenticated by the first entity based on a username and a password provided to the first entity, and
after enabling the upgrade option, login requests corresponding to requests to log in to the service using the access account comprises authentication by the second entity performed at the computer system without authentication by the first entity of username and password information associated with the access account.

3. The computer system of claim 1, wherein the set of criteria includes a second criterion that is met when a password corresponding to the access account does not satisfy one or more security criteria.

4. The computer system of claim 1, wherein the set of criteria includes a third criterion that is met when a password corresponding to the access account is stored on the computer system.

5. The computer system of claim 1, wherein:
the user interface is a login user interface for logging in to the service provided by the first entity, and
the first user input corresponds to a log in option and is indicative of a request to log in to the service provided by the first entity using the access account.

6. The computer system of claim 1, wherein:
the user interface is a settings user interface corresponding to the service provided by the first entity that includes one or more selectable options pertaining to user preferences for the service provided by the first entity, and
the first user input corresponds to a first selectable option in the settings user interface.

7. The computer system of claim 1, wherein:
the user interface is a password reset user interface for resetting a password on the service, and
the first user input is indicative of a request to reset the password associated with the access account.

8. The computer system of claim 1, wherein the user interface is a security recommendations user interface that includes one or more selectable options for a user pertaining to device security for the computer system, and
the first user input corresponds to selection of a first selectable option in the security recommendations user interface.

9. The computer system of claim 1, wherein initiating the process to enable the upgrade option includes:
displaying an information user interface that includes an option that, when selected, requests use of biometric information by the second entity to authenticate the access account to log in to the service.

10. The computer system of claim 1, wherein the one or more programs further include instructions for:
after initiating the process to enable the upgrade option:
receiving, via the one or more input devices, a third user input; and
in response to receiving the third user input:
in accordance with a determination that a second set of criteria is satisfied, wherein the second set of criteria includes a fourth criterion that is met when the upgrade option is enabled, displaying, via the display generation component, a second selectable user interface object corresponding to a downgrade option, wherein the downgrade option is associated with the access account, and enabling the downgrade option disables the upgrade option, and initiates a process for causing login requests corresponding to requests to log in to the service using the access account to be authenticated by the first entity.

11. The computer system of claim 1, wherein enabling the upgrade option comprises maintaining one or more additional settings associated with the access account.

12. A non-transitory computer-readable storage medium storing one or more programs configured to be executed by one or more processors of a computer system that is in communication with a display generation component and one or more input devices, the one or more programs including instructions for:

displaying, via the display generation component, a user interface that includes information associated with a service provided by a first entity;

while displaying the user interface that includes information associated with the service provided by the first entity, receiving, via the one or more input devices, a first user input directed to the user interface;

in response to receiving the first user input directed to the user interface, and in accordance with a determination that a set of criteria is satisfied, wherein the set of criteria includes a first criterion that is met when login requests for an access account of the service are configured to be authenticated by the first entity, displaying, via the display generation component, a first selectable user interface object corresponding to an upgrade option, wherein the upgrade option is associated with the access account;

while displaying the first selectable user interface object, receiving, via the one or more input devices, a second user input; and in response to receiving the second user input:
in accordance with a determination that the second user input corresponds to the first selectable user interface object, initiating a process to enable the upgrade option, wherein enabling the upgrade option causes login requests corresponding to requests to log in to the service using the access account to be authenticated by a second entity different from the first entity without authentication by the first entity of username and password information associated with the access account.

13. The non-transitory computer-readable storage medium of claim 12, wherein,
prior to enabling the upgrade option, login requests corresponding to requests to log in to the service using the access account are authenticated by the first entity based on a username and a password provided to the first entity, and
after enabling the upgrade option, login requests corresponding to requests to log in to the service using the access account comprises authentication by the second entity performed at the computer system without authentication by the first entity of username and password information associated with the access account.

14. The non-transitory computer-readable storage medium of claim 12, wherein the set of criteria includes a second criterion that is met when a password corresponding to the access account does not satisfy one or more security criteria.

15. The non-transitory computer-readable storage medium of claim 12, wherein the set of criteria includes a third criterion that is met when a password corresponding to the access account is stored on the computer system.

16. The non-transitory computer-readable storage medium of claim 12, wherein:
the user interface is a login user interface for logging in to the service provided by the first entity, and
the first user input corresponds to a log in option and is indicative of a request to log in to the service provided by the first entity using the access account.

17. The non-transitory computer-readable storage medium of claim 12, wherein:

the user interface is a settings user interface corresponding to the service provided by the first entity that includes one or more selectable options pertaining to user preferences for the service provided by the first entity, and
the first user input corresponds to a first selectable option in the settings user interface.

18. The non-transitory computer-readable storage medium of claim 12, wherein:
the user interface is a password reset user interface for resetting a password on the service, and
the first user input is indicative of a request to reset the password associated with the access account.

19. The non-transitory computer-readable storage medium of claim 12, wherein the user interface is a security recommendations user interface that includes one or more selectable options for a user pertaining to device security for the computer system, and
the first user input corresponds to selection of a first selectable option in the security recommendations user interface.

20. The non-transitory computer-readable storage medium of claim 12, wherein initiating the process to enable the upgrade option includes:
displaying an information user interface that includes an option that, when selected, requests use of biometric information by the second entity to authenticate the access account to log in to the service.

21. The non-transitory computer-readable storage medium of claim 12, wherein the one or more programs further include instructions for:
after initiating the process to enable the upgrade option:
receiving, via the one or more input devices, a third user input; and
in response to receiving the third user input:
in accordance with a determination that a second set of criteria is satisfied, wherein the second set of criteria includes a fourth criterion that is met when the upgrade option is enabled, displaying, via the display generation component, a second selectable user interface object corresponding to a downgrade option, wherein the downgrade option is associated with the access account, and enabling the downgrade option disables the upgrade option, and initiates a process for causing login requests corresponding to requests to log in to the service using the access account to be authenticated by the first entity.

22. The non-transitory computer-readable storage medium of claim 12, wherein enabling the upgrade option comprises maintaining one or more additional settings associated with the access account.

23. A method, comprising:
at a computer system that is in communication with a display generation component and one or more input devices:
displaying, via the display generation component, a user interface that includes information associated with a service provided by a first entity;
while displaying the user interface that includes information associated with the service provided by the first entity, receiving, via the one or more input devices, a first user input directed to the user interface;
in response to receiving the first user input directed to the user interface, and in accordance with a determination that a set of criteria is satisfied, wherein the set of criteria includes a first criterion that is met when login requests for an access account of the service are configured to be authenticated by the first entity, displaying, via the display generation component, a first selectable user interface object corresponding to an upgrade option, wherein the upgrade option is associated with the access account;

while displaying the first selectable user interface object, receiving, via the one or more input devices, a second user input; and in response to receiving the second user input:
in accordance with a determination that the second user input corresponds to the first selectable user interface object, initiating a process to enable the upgrade option, wherein enabling the upgrade option causes login requests corresponding to requests to log in to the service using the access account to be authenticated by a second entity different from the first entity without authentication by the first entity of username and password information associated with the access account.

24. The method of claim 23, wherein,
prior to enabling the upgrade option, login requests corresponding to requests to log in to the service using the access account are authenticated by the first entity based on a username and a password provided to the first entity, and
after enabling the upgrade option, login requests corresponding to requests to log in to the service using the access account comprises authentication by the second entity performed at the computer system without authentication by the first entity of username and password information associated with the access account.

25. The method of claim 23, wherein the set of criteria includes a second criterion that is met when a password corresponding to the access account does not satisfy one or more security criteria.

26. The method of claim 23, wherein the set of criteria includes a third criterion that is met when a password corresponding to the access account is stored on the computer system.

27. The method of claim 23, wherein:
the user interface is a login user interface for logging in to the service provided by the first entity, and
the first user input corresponds to a log in option and is indicative of a request to log in to the service provided by the first entity using the access account.

28. The method of claim 23, wherein:
the user interface is a settings user interface corresponding to the service provided by the first entity that includes one or more selectable options pertaining to user preferences for the service provided by the first entity, and
the first user input corresponds to a first selectable option in the settings user interface.

29. The method of claim 23, wherein:
the user interface is a password reset user interface for resetting a password on the service, and
the first user input is indicative of a request to reset the password associated with the access account.

30. The method of claim 23, wherein the user interface is a security recommendations user interface that includes one or more selectable options for a user pertaining to device security for the computer system, and
the first user input corresponds to selection of a first selectable option in the security recommendations user interface.

31. The method of claim 23, wherein initiating the process to enable the upgrade option includes:
displaying an information user interface that includes an option that, when selected, requests use of biometric information by the second entity to authenticate the access account to log in to the service.

32. The method of claim 23, further comprising:
after initiating the process to enable the upgrade option:
receiving, via the one or more input devices, a third user input; and
in response to receiving the third user input:
in accordance with a determination that a second set of criteria is satisfied, wherein the second set of criteria includes a fourth criterion that is met when the upgrade option is enabled, displaying, via the display generation component, a second selectable user interface object corresponding to a downgrade option, wherein the downgrade option is associated with the access account, and enabling the downgrade option disables the upgrade option, and initiates a process for causing login requests corresponding to requests to log in to the service using the access account to be authenticated by the first entity.

33. The method of claim 23, wherein enabling the upgrade option comprises maintaining one or more additional settings associated with the access account.

* * * * *